United States Patent
Lee et al.

(10) Patent No.: US 6,615,301 B1
(45) Date of Patent: Sep. 2, 2003

(54) INTEGRATED DATA TRANSCEIVER CIRCUIT FOR USE WITH A SERIAL BUS AND BUS INTERFACE

(75) Inventors: Jae-Jun Lee, Sungnam (KR); Sang-Hyun Han, Ahnyang (KR)

(73) Assignee: Samsung Electronics, Co., LTD, Suwon (KR)

( * ) Notice: Subject to any disclaimer, the term of this patent is extended or adjusted under 35 U.S.C. 154(b) by 0 days.

(21) Appl. No.: 09/264,502

(22) Filed: Mar. 8, 1999

(30) Foreign Application Priority Data

Mar. 9, 1998 (KR) .............................................. 98-7784

(51) Int. Cl.[7] ............................................. G06F 13/42
(52) U.S. Cl. .................... 710/106; 327/170; 326/21; 703/23; 713/503
(58) Field of Search .................. 703/23–27; 341/78–94, 341/100–101; 326/83, 21, 26; 327/108, 170, 379, 387; 710/106; 713/503

(56) References Cited

U.S. PATENT DOCUMENTS

| | | | | |
|---|---|---|---|---|
| 5,325,355 A | | 6/1994 | Oprescu et al. ............. | 370/282 |
| 5,432,817 A | | 7/1995 | Hormel et al. .............. | 375/257 |
| 5,771,389 A | * | 6/1998 | Swartz ........................ | 713/300 |
| 5,808,481 A | * | 9/1998 | Thompson ................... | 326/83 |
| 5,887,150 A | * | 3/1999 | Schneider et al. .......... | 710/100 |
| 5,898,321 A | * | 4/1999 | Ilkbahar et al. .............. | 326/87 |
| 5,912,569 A | * | 6/1999 | Alleven ...................... | 327/108 |
| 5,929,664 A | * | 7/1999 | Alleven ...................... | 327/108 |
| 5,940,448 A | | 8/1999 | Kuo ............................ | 375/316 |
| 6,124,750 A | * | 9/2000 | Alleven et al. ............. | 327/394 |
| 6,218,969 B1 | * | 4/2001 | Watson et al. .............. | 341/100 |

FOREIGN PATENT DOCUMENTS

| | | |
|---|---|---|
| DE | 197154557 | 4/1997 |
| EP | 0632392 | 6/1994 |
| EP | 0664515 | 1/1995 |
| EP | 0691617 | 7/1995 |
| WO | WO 9217938 | 10/1992 |
| WO | WO 9217965 | 10/1992 |
| WO | WO 0031650 | 6/2000 |

OTHER PUBLICATIONS

Anonymous, "Designing a USB Keyboard and PS/2 Mouse Combination Device Using the Cypress Semiconductor CY7C63413 USB Microcontroller", Cypress Semiconductor, pp. 1–10 (Feb. 1998)(downloaded from http://www.cypress.com/pub/appnotes/kbps2.pdf).*

(List continued on next page.)

Primary Examiner—Samuel Broda
(74) Attorney, Agent, or Firm—F. Chau & Associates, LLP

(57) ABSTRACT

An integrated bus interface circuit for a computer system for communicating between a serial bus and a function device. The bus interface circuit includes a voltage regulator, a bidirectional serial data transceiver, a serial interface engine, and a device controller. The voltage regulator supplies a first power supply voltage (e.g., 3.3 volts) in a first voltage range by using a second power supply voltage (e.g., 5 volts) in a second voltage range. The transceiver converts a plurality of bus-specific data signals (e.g., 3.3V modulated format) into a plurality of interface-specific data signals (e.g., 5V modulated format), and conversely, by using the first and second power supply voltages. The serial interface engine performs an interface between the interface-specific signals and a plurality of device-specific signals (e.g., 5V binary format). The device controller controls the function device in response to the device-specific signals.

35 Claims, 15 Drawing Sheets

OTHER PUBLICATIONS

Keating, "Building a Universal Serial Bus Keyboard Hub Using the Motorola MC68HC(9)08KH12", Motorola Semiconductor Application Note AN1748, pp. 1–23 (1998).*

Anonymous, "USS–720 Instant USB USB–to–IEEE 1284 Bridge", Lucent Technologies Advance Data Sheet, Rev. 5, pp. 1–27 (Nov. 1997).*

Nass, "The Universal Serial Bus is Ready to Take Off as Components and End Products Hit the Street", Electronic Design, vol. 45 Issue 16, pp. 56 and 58 (Aug. 4, 1997).*

Bearfield, "Control the Power Interface of USB's Voltage Bus", Electronic Design, vol. 45 Issue 14, pp. 80 et seq (Jul. 21, 1997).*

Philips Semiconductor, Universal Serial Bus Transceiver, Sep. 16, 1997, pp. 1–10.

Makoto Takahashi, et al. , "3.3V–5V Compatible I/O Circuit Without Thick Gate Oxide", May 3, 1992. pp. 23.3.1–23.3.4 IEEE 1992, Custom Integrated Circuits Conference.

"Design Guide For A Low Speed Buffer For The Universal Serial Bus" Dec., 1996, pp. 1–29., Intel Corporation.

Philips Semiconductor, "PDIUSBP11 USB Transceiver", Jul. 1, 1997, pp. 1–3.

* cited by examiner

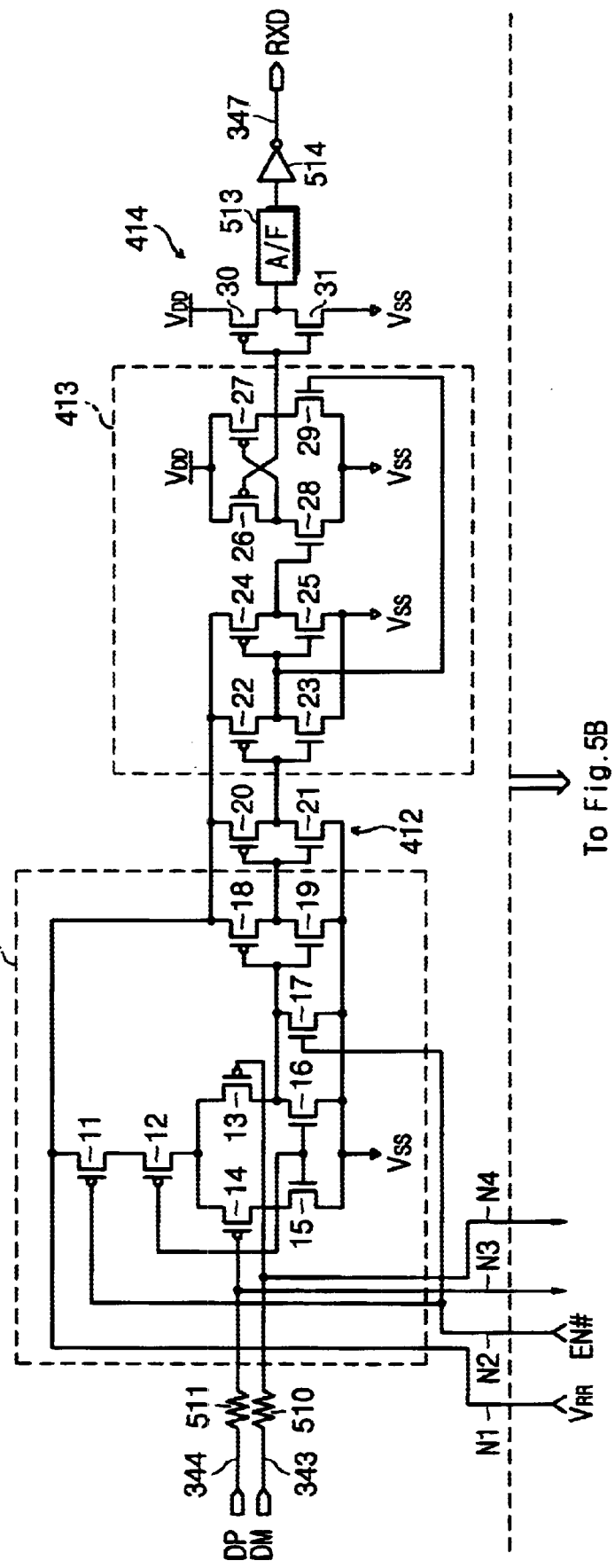

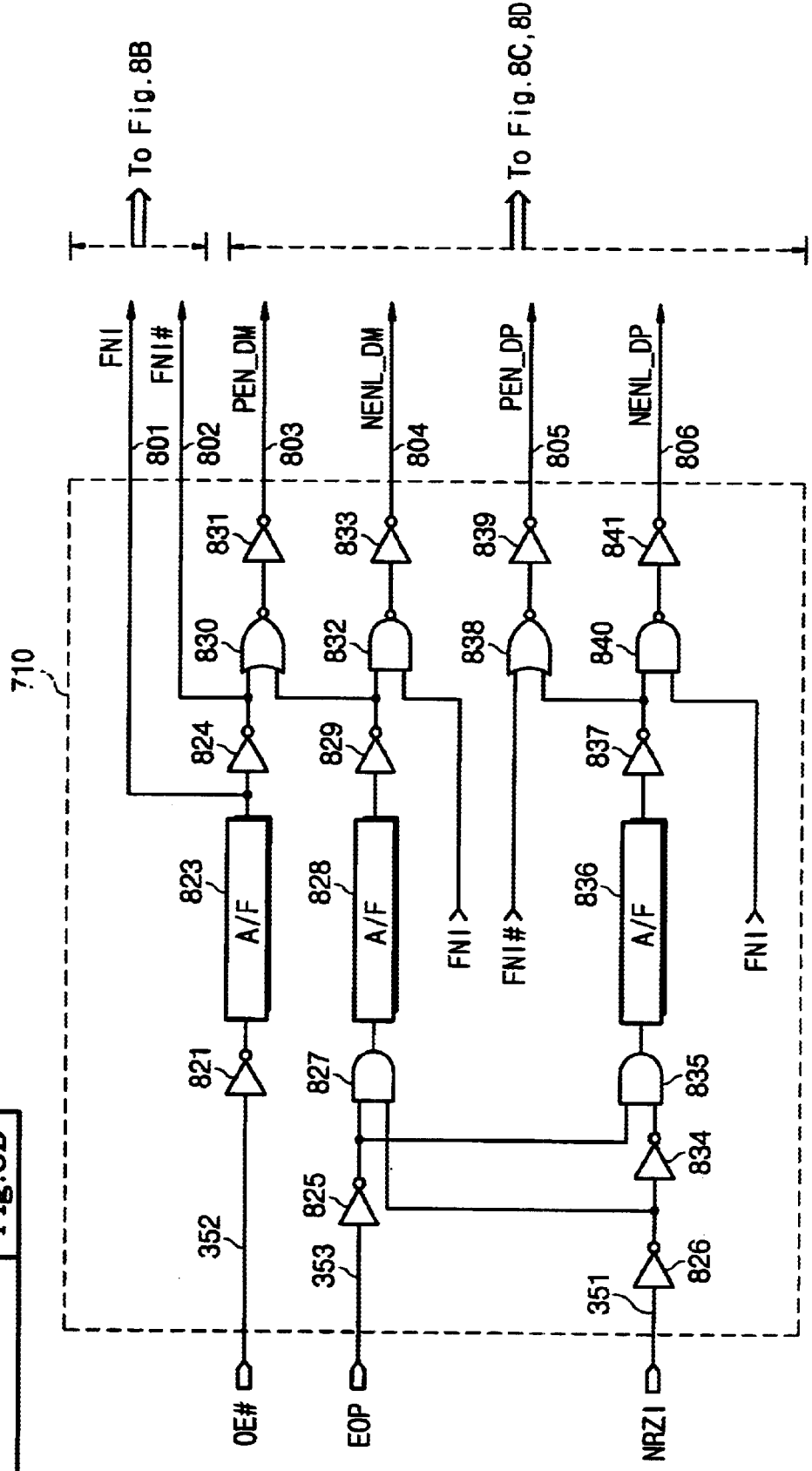

INTEGRATED DATA TRANSCEIVER CIRCUIT FOR USE WITH A SERIAL BUS AND BUS INTERFACE

FIELD OF THE INVENTION

The present invention relates to integrated bidirectional transceiver (transmitter and receiver) circuits for use in data transmission systems and, more particularly, to integrated interface circuits for transmitting/receiving data items serially to/from a data bus connected to a data transmission system.

The present invention further relates to integrated interface circuits for interfacing signal buses and devices connected thereto in digital data processing systems and, more particularly, to interface circuits for interfacing general-purpose serial buses and devices connected thereto.

BACKGROUND OF THE INVENTION

In the field of personal computers (PCs) and accessories, there have been rapid performance improvements in processors and memories. For example, processors have progressed from Pentium to Pentium III, and DRAM speed and sizes continually improved through the 1990's. However, peripherals such as keyboards, mouses, monitors, printers, speakers, microphones, and telephone/fax modems, remained largely unchanged during this period.

With the advent of new advanced general-purpose buses, such as USB (Universal Serial Bus), FW (Fire Wire; sometimes called IEEE1394), FC (Fiber Channel), and SSA (Serial Storage Architecture), major changes to almost every peripheral for personal computers or workstations are imminent. The advanced serial buses are described, for example, in U.S. Pat. Nos. 5,523,610; 5,621,901; and 5,579,336.

Among the above advanced buses, USB promises to become a next generation computer peripheral interface, along with FW suitable for multimedia environments. USB brings Plug-and-Play technology to the external input and output devices found on today's high-performance PCs or workstations. USB has three major advanced features as follows: (1) ease of use through hot plugging and automatic configuration, (2) standardized connection points and simplified connector design, and (3) simple expansion through the use of a tiered-star hub topology.

Older computer connections like RS232 COMx serial ports and parallel printer LPTx ports can only be connected to a single device at a time. In contrast, USB allows simultaneously attaching and using of multiple devices on the same bus. USB also allows these devices to be attached and removed while the computer system is running and without requiring a reboot to use a newly attached device. USB allows virtually unlimited PC expansion "outside the box". Once PC users open the box to install expansion cards, they are faced with a complex and bewildering collection of dip switches, circuit boards, jumper cables, peripheral drivers, IRQ settings, DMA channels and I/O addresses that must be configured—and often reconfigured. To make matters worse, expanding PC functionality often brought increased system crashes, thereby costing work productivity, time, and effort to the frustrated users. For any PC user who has ever guessed about which port to select, or fretted over a dip switch, USB is the solution. With USB, PC users no longer need to worry about selecting the right serial port, installing expansion cards, or the technical headaches of dip switches, jumpers, software drivers, IRQ settings, DMA channels and I/O addresses.

The USB specification (Reversion 1.0 Jan. 15, 1996) defines four transfer types to enable a variety of peripherals: Control, Isochronous, Interrupt and Bulk. Every peripheral must support Control transfers for configuration, command, and status information flows. Isochronous transfers provide guaranteed bus access, constant data rate and error tolerance for devices such as computer-telephone integration, audio systems, and multimedia game equipment. Interrupt transfers were designed to support human input devices such as joysticks, mice and keyboards that communicate the occasional bursts of data, but with bounded service periods. Bulk transfers enable devices like printers, scanners, and digital cameras to communicate a larger amount of data to the PC as bus bandwidth becomes available.

The USB topology has three elements that work together to enable the four different transfer types: Host, Hub, and Function. Within a USB system, the host controls the flow of data and control information over the bus. This host capability is normally found on the PC motherboard. Functions provide capabilities to the host system. These functions can include typical PC activities such as keyboard or joystick input and monitor controls, or more advanced activities like digital telephony and image transfer. Finally, hubs provide an expansion point for USB by supplying a connection to other USB functions. USB hubs play an integral role in expanding the world of the PC user. With device connections furnished by embedded hubs in keyboards, monitors, printers, and other devices, attaching or removing a new peripheral is as simple as reaching for the plug.

For even simpler connectivity, the USB cable consists of only four wires: $V_{bus}$, DP(or D+), DM (or D−), and GND. A single standardized upstream connector type further increases the ease-of-use of USB peripherals. The data is differentially driven over DP and DM at a bit rate of 12 Mbps for full-speed signaling, or a rate of 1.5 Mbps for the USB low-speed signaling mode. The data transfer rate of 12 Mbps supports a wide variety of peripherals, from modems, printers, microphones, and speakers to graphics tablets, game controls, joysticks, scanners, monitors and digital cameras. The low-speed 1.5 Mbps option supports low-end, low-speed devices such as keyboards and mice for further cost reduction. Also, since USB distributes power ($V_{bus}$), many peripheral products (low-power devices) no longer require separate power supplies.

As discussed above, since USB does not require the investment in expansion cards, the net cost of implementing new peripheral products can be substantially lower. Also, the universal compatibility of USB eliminates much of the cost of testing and validation of varying PC-peripheral-software combinations, while accelerating time-to-market. Thus, USB, featuring the above-described levels of throughput and expanded connectivity sites, could even bring about many new peripherals for the next generation of entertainment and productivity applications.

SUMMARY OF THE INVENTION

It is an object of the present invention to provide bidirectional serial data transceiver circuits for data transmission systems.

It is another object of the present invention to provide integrated serial bus interface circuits for transmitting/receiving data items serially to/from a data bus connected to a data transmission system.

It is still another object of the present invention to provide integrated serial bus interface circuits for interfacing serial signal bus cables and devices connected there to in digital data processing systems.

It is still another object of the present invention to provide serial bus interface circuits for interfacing general-purpose serial bus cables and devices connected thereto.

It is yet another object of the present invention to provide low-speed interface circuits for USB (universal serial bus), having simple architectures and are implemented on a single chip.

These and other objects, features and advantages of the present invention are provided by an integrated bus interface circuit for a computer system, which provides communication between a serial bus such as an USB cable and a function device such as a computer keyboard or mouse. An interface circuit according to the present invention includes a voltage regulator, a bidirectional serial data transceiver, a serial interface engine, and a device controller. The voltage regulator supplies a first power supply voltage (e.g., 3.3 volts) in a first voltage range by using a second power supply voltage (e.g., 5 volts) in a second voltage range. The transceiver converts a plurality of first signals of a bus-specific format (e.g., 3.3V modulated format) into a plurality of second signals of an interface-specific format (e.g., 5V modulated format), and conversely, by using the first and second power supply voltages. The serial interface engine performs an interface between the second signals and a plurality of third binary data signal of a device-specific format (e.g., 5V binary format). The device controller controls the function device in response to the third signals. The transceiver includes a transmitter for generating the bus-specific signals, a receiver for generating the interface-specific signals and a control logic controls the operations of the transmitter and receiver in response to a Tx/Rx select signal from the serial interface engine.

In a bus interface circuit according to the invention, the transmitter is responsive to a first encoded input data signal (e.g., NRZI) of the interface-specific format and a data end signal (e.g., EOP) to indicate an end of the first encoded input data signal from the interface engine which are of the interface-specific format, and provides a first and second encoded output data signals (e.g., DM and DP) of the bus-specific format to the serial bus. The receiver generates a plurality of encoded output data signals (e.g., RXDM, RXD and RXDP) of the interface-specific format in response to a couple of encoded input data signals (e.g., DM and DP) of the bus-specific format from the serial bus, so as to provide the encoded output data signals to the serial interface engine. The control logic selectively activates either of the transmitter and the receiver in response to a Tx/Rx select signal (e.g., SEL) from the serial interface engine. One of the third to fifth encoded output data signals is a differential signal of the other ones. The voltage regulator, transceiver, serial interface engine, and device controller are preferably implemented on a single semiconductor chip.

In the bus interface circuit, the integrated receiver includes a differential amplifier, two level shifters, three schmitt triggers, and an output drive logic. The differential amplifier amplifies a voltage difference between the first and second input data signals so as to generate a differential signal which swing in the same range as the data signals (e.g., DM and DP). The first level shifter shifts the swing voltage levels of the differential signal so as to generate a level-shifted differential signal as a first output data signal (RXD). The first schmitt trigger generates an output signal which exhibits a hysteresis in response to the swing of the first input data signal. The second level shifter which shifts the swing voltage levels of the output signal of the first schmitt trigger so as to generate a first level-shifted output data signal. The second schmitt trigger generates an output signal with a hysteresis in response to the swing of the second input data signal. The third level shifter shifts the swing voltage levels of the output signal of the second schmitt trigger so as to generate a second level-shifted output data signal. The output drive logic generates a second and third output data signals (e.g., RXDP and RXDM) in response to the enable signal and the first and second level-shifted output data signals. In this receiver circuit, the second and third output data signals are driven to a first data state when the input data signals both are in a first logic state and the enable signal is inactivated; to a second data state when the first input data signal is in a second logic state, the second input data signal in the second logic state and the enable signal is activated; and to a third data state when the first input data signal is in the first logic state, the second input data signal is in the second logic state and the enable signal is activated, respectively.

In the bus interface circuit, the transmitter comprises a first circuit responsive to a plurality of externally applied input signals and generates a plurality of state control signals (e.g., FNI, FNI#, PEN_DM, NENL_DM, PEN_DP, NENL_DP) to determine when the first and second data signals are driven to their predetermined data states, a second circuit which is responsive to the state control signals and generates a plurality of slope control signals (e.g., PBIAS, HVDD and NBIAS) to control edge rates of the data signals, a third circuit which is responsive to the state and slope control signals and generates the first data signal (DM) to be transmitted onto a first data line, and a fourth circuit which is responsive to the state and slope control signals and generates the second data signal (DP) to be transmitted onto a second data line. In the transmitter, the input signals comprises an encoded data signal (e.g., NRZI), a data end signal (e.g., EOP) to indicate an end of the encoded data signal, and an output enable signal (e.g., OE#). Also, in the transmitter, the first and second transmitted data signals (DM and DP) are driven to a first data state (e.g., Single Ended Zero state) when the data end and output enable signals are activated; to a second data state (e.g., Differential zero state) when the encoded data signal is in a first logic state, the data end signal is inactivated and the output enable signal is activated; and to a third data state (e.g., Differential one state) when the encoded data signal is in a second logic state, the data end signal is inactivated and the output enable signal is activated, respectively. When the output enable signal is inactivated, the first and second transmitted data signals (DM, DP) are driven to a high impedance state.

The transmitter of the present invention is implemented with no more than two operational amplifiers and their respective output drivers, providing increased integration for the bus interface chip, and improved internal capacitance facilitating stable output characteristics even with large variances in the load.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 5A and 5B are detailed circuit diagrams of the bus receiver of FIG. 4;

FIGS. 8A through 8D are detailed circuit diagrams of the bus transmitter of FIG. 7.

DETAILED DESCRIPTION OF THE PREFERRED EMBODIMENTS

Preferred embodiments of the present invention will now be described with reference to the accompanying drawings. In the following description, specific details are set forth to provide a thorough understanding of the present invention. However, it will be obvious to those skilled in the art that the present invention may be practiced without these particulars.

Figure 1:
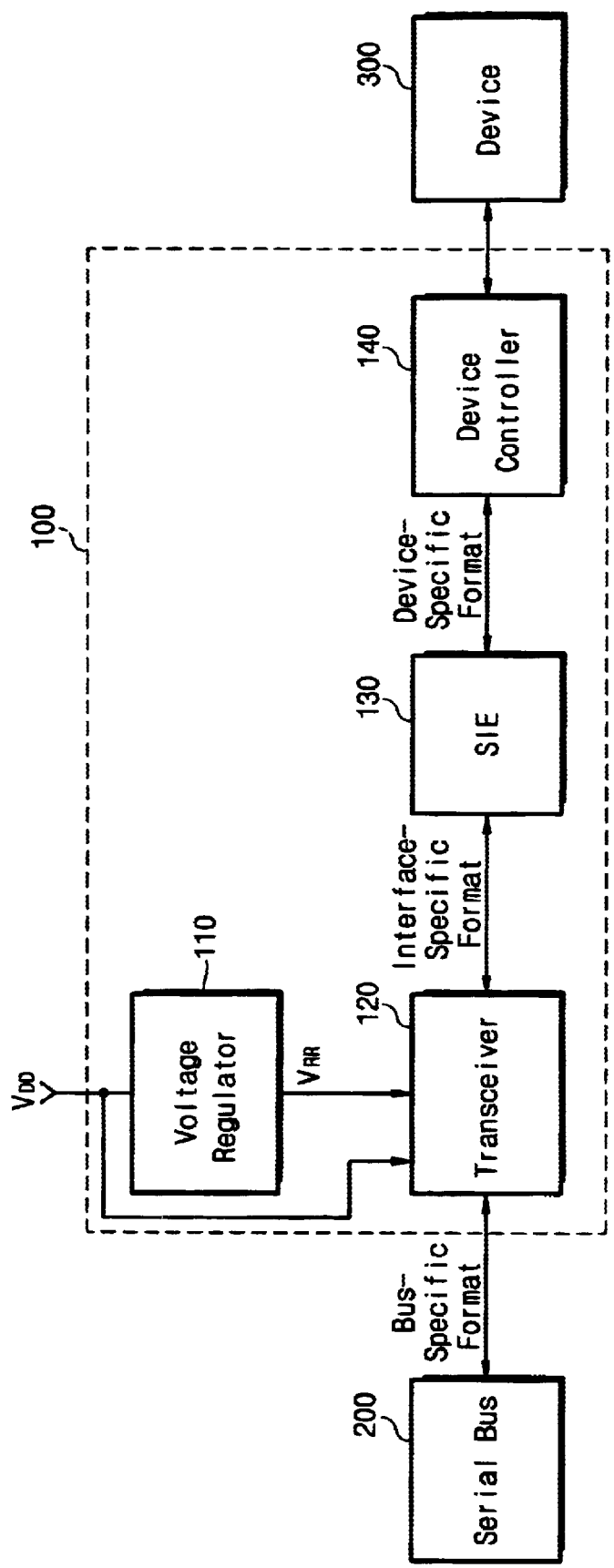
FIG. 1 is a block diagram of a preferred embodiment of a bus interface device according to the present invention.

FIG. 1 is a block diagram of a preferred embodiment of a bus interface device 100 according to the present invention. Referring to FIG. 1, the bus interface device 100 is connected between a serial bus 200, such as a USB cable or an FW bus cable, and a function device 300 such as a keyboard or a mouse. For the purposes of explanation, the serial bus 200 is assumed to be a USB cable. The bus interface device 100 comprises a voltage regulator 110, a bus signal transceiver 120, a serial bus interface engine (SIE) 130, and a device controller 140. The voltage regulator 110 provides a first constant power supply voltage $V_{RR}$ in a first voltage range about from 0 to 3.5 volts (preferably, from 0 to 3.3 V) to the transceiver 120 by using a second power supply voltage $V_{DD}$ in a second voltage range about from 0 to 5 volts. The transceiver 120 converts a plurality of first encoded signals of a bus-specific format (e.g., 3.3 V modulated format) into a plurality of second encoded signals of an interface-specific format (e.g., 5 V modulated format), and conversely, receiving the first and second power supply voltages $V_{RR}$ and $V_{DD}$. The interface engine 130 performs an interface between the second signals of the interface-specific format and a plurality of third signals of a device-specific format (e.g., 5 V binary format). The device controller 140 controls operations of the function device 300 in response to the third signals of the device-specific format. The above-described bus interface device 100 of the invention preferably has a data transfer rate of 1–2 Mbps, so it is suitable for supporting low-end, low-speed devices such as keyboards and mice.

The USB uses a differential output driver to drive the USB data signal onto the USB cable. The static output swing of the driver in its low state must be below the $V_{OL}$ of 0.3 V with a 1.5 kΩ load to 3.6 V and in its high state must be above the $V_{OH}$ of 2.8 V with a 15 kΩ load to ground. The output swings between the differential high and low states must be well balanced to minimize signal skew. Slew rate control on the driver is required to minimize the radiated noise and crosstalk. The driver's outputs must support three-state operation to achieve bidirectional half duplex operation. High impedance is also required to isolate the port from downstream devices that are being hot inserted or which are connected but powered down.

A low-speed USB connection is made through an unshielded, untwisted wire cable a maximum of 3 meters in length. The rise and fall times of the signals on this cable must be greater than 75 ns to keep RFI emissions under FCC class B limits, and less than 300 ns to limit timing delays and signaling skews and distortions. The driver must also reach the specified static signal levels with smooth rise and fall times, and minimal reflections and ringing when driving the untwisted wire cable. This cable and driver are used only on network segments between low-speed devices and the ports to which they are connected.

USB supports a range of devices as categorized by their power consumption; these include bus-powered devices which rely totally on power from the cable and self-powered devices which have an alternative source of power. Bus-powered hubs draw all of the power to any internal functions and downstream ports from the USB connector power pins. In self-powered hubs, power for the internal functions and downstream ports does not come from USB, although the USB interface may draw up to one load from its upstream connection to allow the interface to function when the remainder of the hub is powered down. In low power, bus-powered functions, all power to these devices comes from USB connector. They draws no more than one unit load at any time. For high power, bus-powered functions, all power to these devices comes from USB connector. They draws no more than one unit load upon power up and can draw up to five unit loads after being configured. Self-powered functions draw up to one load from their upstream connection to allow the interface to function when the remainder of the hub is powered down. All other power comes from an external to USB source.

The states of data signals transmitted through USB cables range about from 0 to 3.8 volts (preferably, 0–3.3 V), but those of the data signal processed within USB devices swing about between 0 volts and 5 volts. Hence, the respective USB devices require 3.3 V power.

Figure 2:
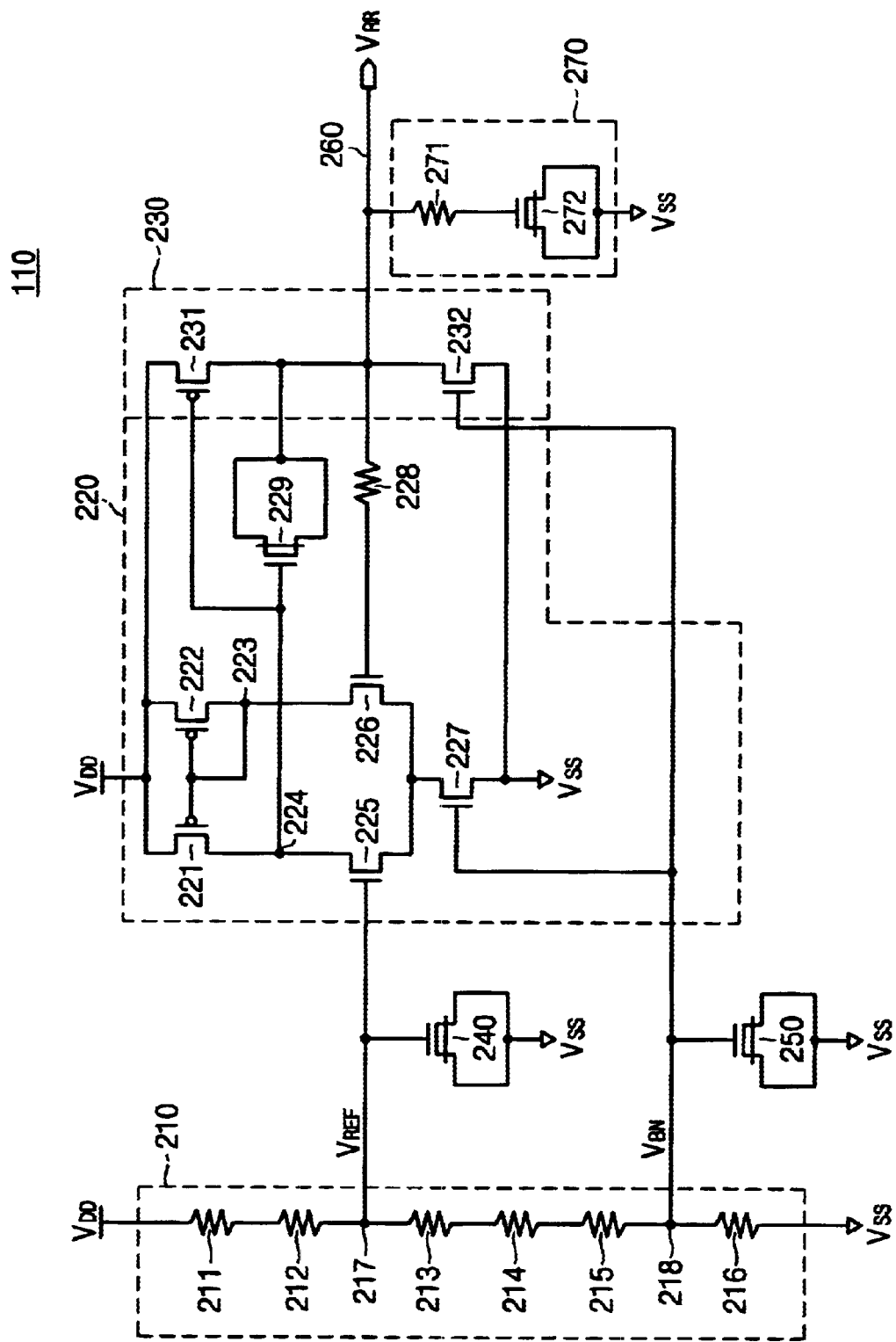
FIG. 2 is a detailed circuit diagram of the voltage regulator of FIG. 1.

FIG. 2 shows a detailed circuit configuration of the voltage regulator 110, which can easily be integrated into a single semiconductor chip. With reference to FIG. 2, the voltage regulator 110 includes a reference level generator 210, a current amplifier 220, an output driver 230, an N-channel type of depletion mode metal-oxide-semiconductor (hereinafter, refer to "D-NMOS") capacitors 240 and 250, an output terminal 260 for supplying a regulated voltage $V_{RR}$ in a range about from 3.0 to 3.6 V (preferably, 3.3 V), and a noise eliminator 270.

The reference level generator 210 includes a plurality of resistors 211–116 connected in series between the second power supply voltage $V_{DD}$ in a range about from 4.5 to 5.4 volts (preferably, 5V) and a third power supply voltage $V_{SS}$ of 0 V (i.e., ground voltage). The supply voltage $V_{DD}$ is divided by the resistors 211–216. Two reference voltages $V_{REF}$ and $V_{BN}$ are output from nodes 217 and 218 in the reference level generator 210, respectively. The reference voltage $V_{REF}$ is approximately $V_{DD}/1.5$ and the voltage $V_{BN}$ is about $V_{DD}/4.5$. The capacitors 240 and 250 are coupled to the nodes 217 and 218, respectively, to eliminate ripple components on the voltages $V_{REF}$ and $V_{BN}$.

As can be seen from FIG. 2, the current amplifier 220 is constructed of a tail-down differential amplifier. The amplifier 220 includes a current mirror (or an active load) including P-channel type of MOS (hereinafter, refer to "PMOS") transistors 221 and 222, a differential pair consisting of N-channel type of MOS (hereinafter, refer to "NMOS") transistors 225 and 226, an NMOS current sinker transistor 227, a feedback resistor 228 coupled between gate electrode of the transistor 226 and the output terminal 260, and a D-NMOS capacitor 229. The reference voltages $V_{REF}$ and $V_{BN}$ are applied to gate electrodes of the transistors 225 and 227, respectively. The capacitor 229 is coupled between a node 224 (i.e., the drain junction of the transistors 221 and 225) and the output terminal 260 so as to complement the differences between the input and output voltage phases of the current amplifier 220.

The output driver 230 includes a PMOS pull-up transistor 231 and an NMOS pull-down transistor 232. Gate electrode of the pull-up transistor 231 is connected to the node of the current amplifier 220 and that of the pull-down transistor 232 to the node 218 of the reference level generator 210.

The noise eliminator 270 connected to the output terminal 260 is made up of a resistor 271 and a D-NMOS capacitor 272. The resistor 271 coupled between the output terminal 260 and gate electrode of the MOS capacitor 270 is provided to prevent the gate oxide of the capacitor 272 from being damaged because of electrostatic discharge (ESD).

Figure 3:
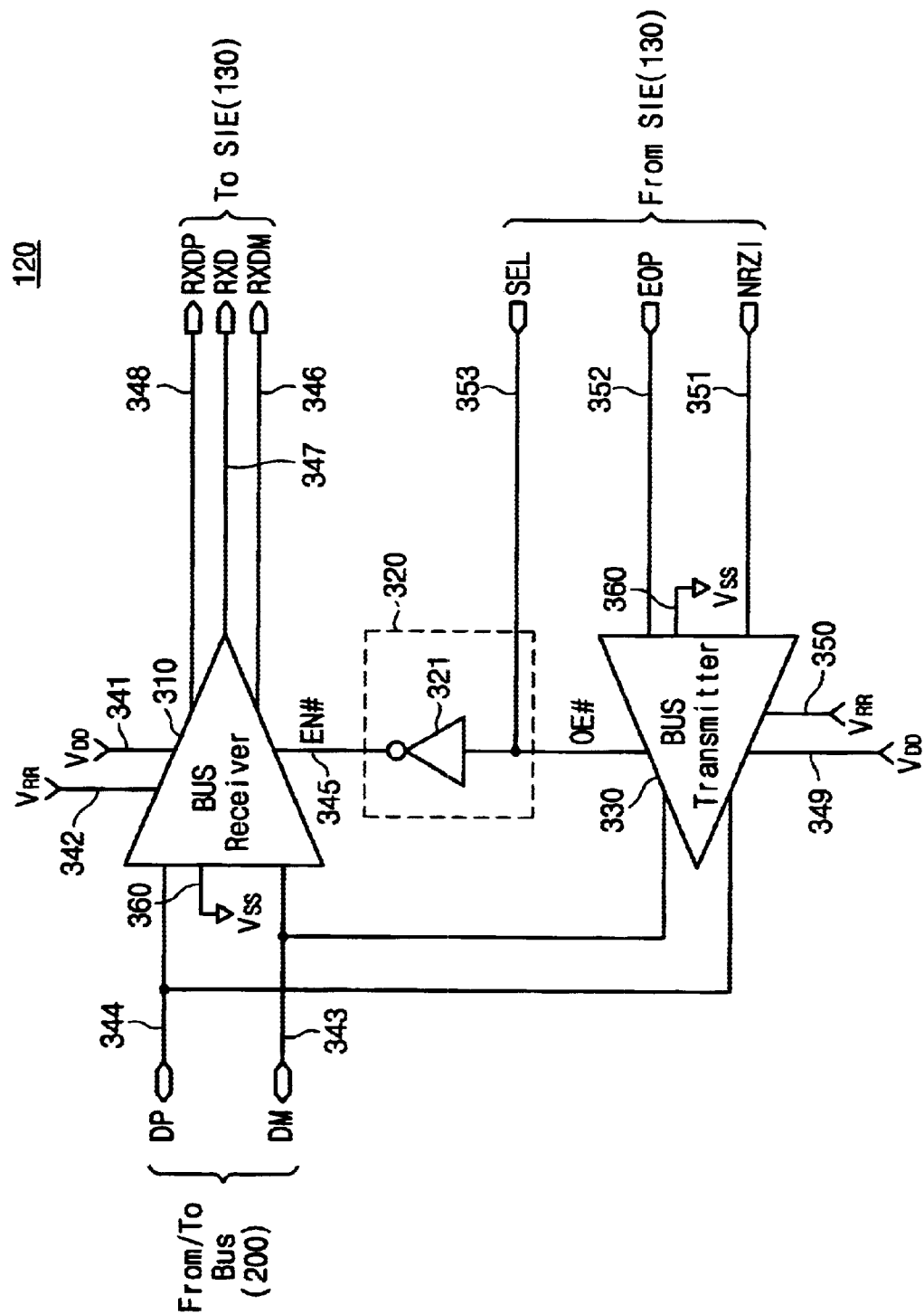
FIG. 3 is a block diagram showing a circuit configuration of the transceiver of FIG. 1.

Referring to FIG. 3, a preferred circuit configuration of the transceiver circuit 120 of FIG. 1 is illustrated. The transceiver 120, as seen from FIG. 3, includes a bus signal receiver circuit 310 for receiving bus signals from the data lines 343 and 344 of the USB cable 200, a bus signal transmitter circuit 330 for transmitting bus signals onto the data lines 343 and 344, and a control logic 320 for enabling/disabling the receiver 310 and the transmitter 330 alternately in response to control signals from the serial interface engine 130.

The USB employs NRZI (Non Return to Zero) data encoding when transmitting packets. In NRZI encoding, a "1" is represented by no change in level and a "0" is represented by a change in level.

The receiver 310 receives a couple of bus-specific data signals DP and DM (i.e., NRZI signals swinging about between −0.5 V and 3.8 V) from the USB cable 200 and produces three interface-specific signals RXDP, RXD and RXDM (i.e., signals swinging about between 0 V and 5 V) for the serial interface engine 130. The interface-specific data signals RXDP and RXDM corresponds to the bus-specific data signals DP and DM, respectively. The interface-specific differential signal RXD is a differentially amplified signal of the signals DP and DM. These signals RXDP, RXD and RXDM are provided to the serial bus engine 130.

The transmitter 330 changes a pair of interface-specific signals NRZI and EOP (i.e., signals swinging about between 0 V and 5 V) from the serial interface engine 130 into a corresponding pair of bus-specific signals DP and DM (i.e., signals swinging about between −0.5 V and 3.8 V). The bus-specific signals DP and DM are provided to the USB cable 200.

The receiver 310 and the transmitter 330 are controlled by the serial interface engine 130 so as to be enabled/disabled alternately. The control logic 320 formed by an inverter 321 enables/disables the receiver 310 and the transmitter 330 alternately in response to a Tx/Rx select signal SEL from the serial interface engine 130. For example, the control logic 320 enables the transmitter 330 when the select signal SEL becomes active (Low). The control logic 320, in contrast, enables the receiver 310 when the select signal SEL becomes deactivated (High). The control logic 320 generates two complement signals: one is the receiver enable signal (or input enable signal) EN# and the other is the transmitter enable signal (or output enable signal) OE#. The receiver enable signal EN# is an inverted signal of the select signal SEL and the transmitter enable signal OE# is substantially the same signal as the select signal SEL. The receiver 310 and the transmitter 330 are enabled when the respective signals EN# and OE# go low.

Figure 4:
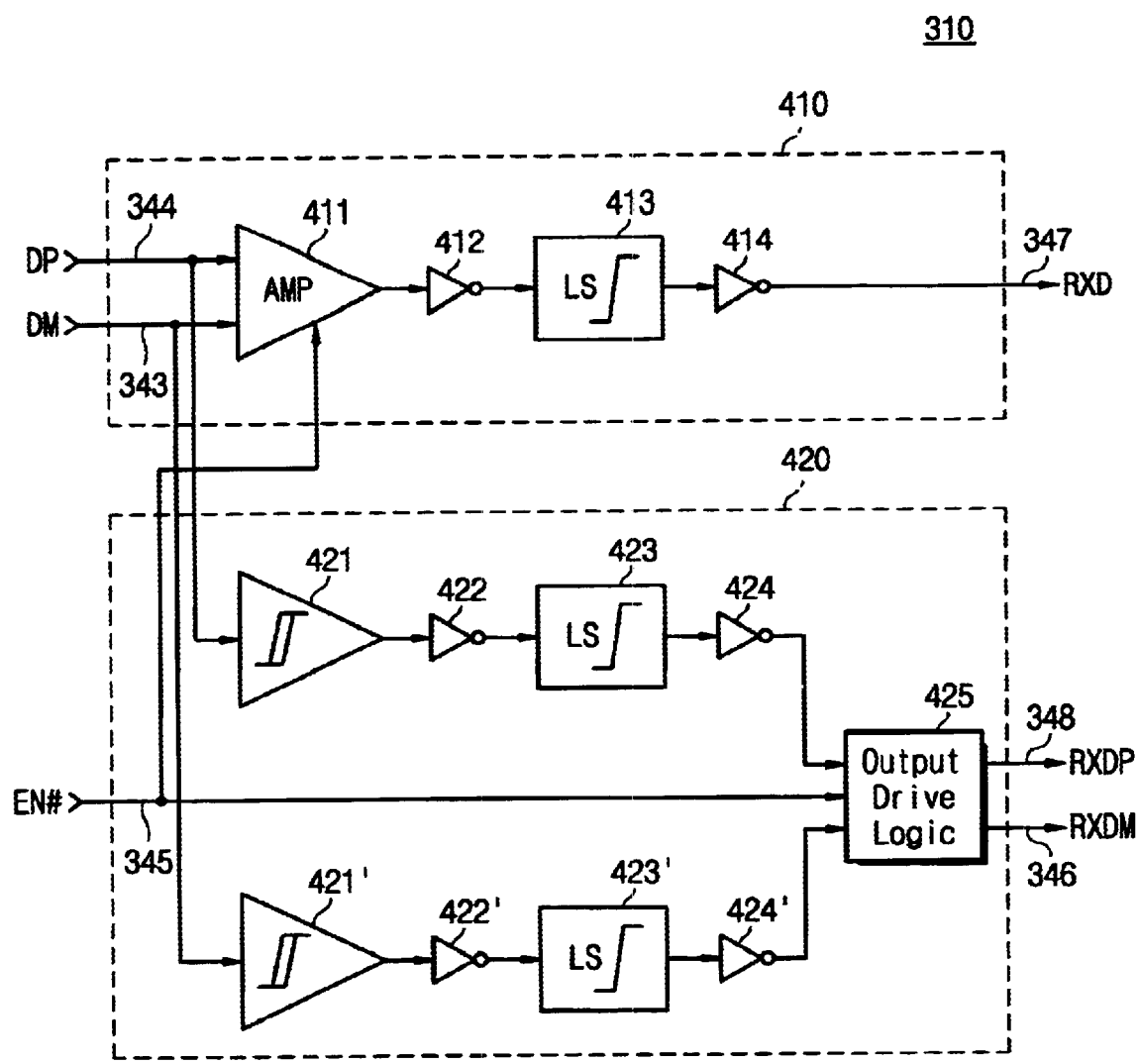
FIG. 4 is a block diagram showing a circuit configuration of the bus receiver of FIG. 3.

FIG. 4 illustrates a circuit configuration of the bus receiver circuit 310. In FIG. 4, reference numeral 410 designates a differential signal generator circuit which differentially amplifies the bus-specific signals DP and DM and generates the interface-specific differential signal RXD. The reference numeral 420 designates a bus-to-interface data signal convertor circuit which converts the bus-specific data signals DP and DM into the interface-specific data signals RXDP and RXDM. The differential signal generator circuit 410 includes a differential amplifier 411 and a level shifter 413. Inverters 412 and 414 are also provided for the circuit 410, which function as signal buffers. The bus-to-interface data signal convertor circuit 420 has two schmitt triggers 421 and 421', two level shifters 423 and 423', and an output drive logic 425. This circuit 420 further includes inverters 422, 424, 422' and 424', which function as signal buffers too.

The differential amplifier 411 is supplied with the data signals DP and DM from the USB cable 200. It is also fed with the receiver enable signal EN# from the control logic 320. The signals DP and DM are also provided to the level shifters 421 and 421', respectively. The signal EN# is also provided to the output drive logic 425. The bus receiver 310 has the characteristics as shown in the following functional truth table:

TABLE 1

| Inputs | | | Outputs | | | |
|---|---|---|---|---|---|---|
| EN # | DP | DM | RXDP | RXDM | RXD | State |
| 1 | X | X | 0 | 1 | 0 | Rx Disable |
| 0 | 0 | 0 | 0 | 0 | X | Single Ended Zero |
| 0 | 0 | 1 | 0 | 1 | 0 | Differential Zero (J-state) |
| 0 | 1 | 0 | 1 | 0 | 1 | Differential One (K-state) |

In the above table, "X" represents "Don't Care" state.

In the receiver 310, when the EN# signal is inactivated, the DM and DP signals are driven to the Rx Disable state. The RXDP and RXDM signals are driven to the Single Ended Zero state when the signals DP and DM both are in the "0" state and the EN# signal is activated. If the DP and DM signal remains in the "0" and "1" states, respectively, and the enable signal is activated, then the RXDP and RXDM are driven into the Differential Zero state (J-state). If the DP and DM signal remains in the "1" and "0" states, respectively, and the enable signal is activated, then the RXDP and RXDM signals are driven into the Differential One state (K-state).

Figure 5B:
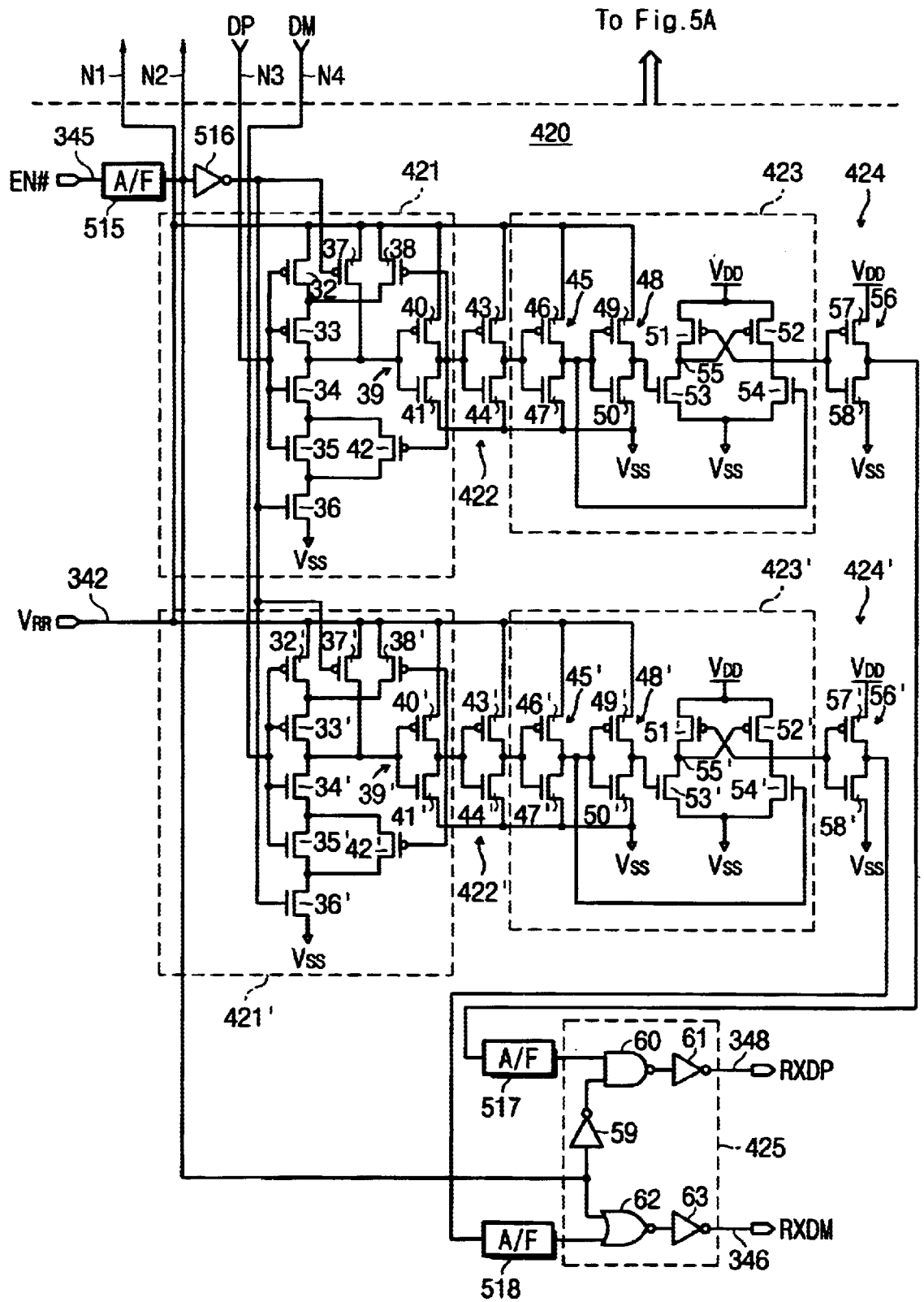

FIGS. 5A and 5B are detailed circuit diagrams illustrating the circuit configurations of the differential signal generator circuit 410 and the bus-to-interface data signal convertor 420, respectively, which are embodied with the Table 1.

Referring first to FIG. 5A, the differential amplifier 411 is formed by the MOS transistors 11–19. PMOS transistors 13 and 14 (differential pair of the amplifier 411) are connected to the USB cable data lines 343 and 344 (DM and DP) through the resistors 510 and 511, respectively. A node N1 of the amplifier 411 is supplied with the regulated voltage $V_{RR}$ from the voltage regulator 110 (referring to FIG. 5B). Another node N2 of the amplifier 411 is applied with the receiver enable signal EN# from the control logic 320. The level shifter 413 is made up of MOS transistors 22–29.

Between the differential amplifier 411 and the level shifter 413, a CMOS inverter 412 consisting of a PMOS transistor 20 and an NMOS transistor 21 is placed. As can be seen from FIG. 5A, an active filter circuit 513 is provide for eliminating noise in the output stage of the circuit 410. Another CMOS inverter 414, formed by a PMOS transistor 30 and an NMOS transistor 31, is connected between the level shifter 413 and the active filter 513. The other CMOS inverter 514 is provided between the active filter 513 and the RXD output node 347. The level shifter 413, the CMOS inverters 414 and 514, and the active filter 513 are commonly provided with the power supply voltage $V_{DD}$ of about 5 V. The output signal of the level shifter 413 is output as the interface-specific differential signal RXD of the bus-specific data signals DP and DM through the inverter 414, active filter circuit 513 and inverter 514. The signal RXD is provided to the serial interface engine 130. The detailed circuit construction of the active filter circuit 513 will be described later.

With reference to FIG. 5B, the schmitt trigger 421 includes MOS transistors 32–42. The schmitt trigger 421' has the same construction as the schmitt trigger 421 and is provided with MOS transistors 32'–42'. The schmitt triggers 421 and 421' are commonly supplied with the regulated voltage $V_{RR}$ from the voltage regulator 110. The receiver enable signal EN# from the control logic 320 is provided to the schmitt triggers 421 and 421' via an active filter 515. More specifically, an output of the active filter 515 is provide via a CMOS inverter 516 to the schmitt trigger 421, while it is directly to the schmitt trigger 421'. The output of the inverter 516 makes the schmitt trigger 421 enabled/disabled by turning on/off the NMOS and PMOS transistors 36 and 37. Similarly, the receiver enable signal E# makes the schmitt trigger 421' enabled/disabled by turning on/off the NMOS and PMOS transistors 36' and 37'. Signal input node N3 of the schmitt trigger 421 is applied with the bus-specific data signal DP and signal node N4 of the schmitt trigger 421' with the bus-specific data signal DM. The schmitt triggers 421 and 421' produces their output signals which exhibit hysteresis in response to the bus-specific data signals DP and DM: that is, the output signal of the schmitt trigger 421 (or 421') will change from a low level to a high level only if the voltage level of the input signal DP (or DM) has reached an upper trip point (or upper threshold level); the output signal of the schmitt trigger 421 (or 421') does not change until the voltage level of the input signal DP (or DM) falls to a lower trip point (or a lower threshold level) lower than the upper trip point in voltage; thereafter, when the voltage level of the input signal DP (or DM) has arrived at the lower trip point, the output signal of the schmitt trigger 421 (or 421') will change the high level to low level. The output signals of the schmitt triggers 421 and 421' are provided via CMOS inverters 422 and 422' to the level shifters 423 and 423', respectively.

As seen from FIG. 5B, the level shifters 423 and 423' have the same configuration. The level shifter 423 is formed by MOS transistors 46–54 and level shifter 423' by MOS transistors 46'–54'. These level shifters 423 and 423' are supplied with the power supply voltage $V_{DD}$ of about 5 V. The level shifters 423 and 423' change the bus-specific data signals swinging in the range about from 0 to 3.3 V into the interface-specific data signals swinging in the range about from 0 to 5 V. Output signals of the level shifters 423 and 423' are provided to an output drive logic 425 through CMOS inverters 56 and 56' and active filters 517 and 518.

The output drive logic 425 includes a NAND gate 60, a NOR gate 62, and inverters 59, 61 and 63. The NAND gate 60 has two inputs coupled to the active filter 517 and the inverter 59, respectively, and its output coupled to the inverter 61. The NOR gate 62 has its two inputs coupled to the active filters 515 and 518, respectively, and its output coupled to the inverter 63. Outputs of the inverters 61 and 63 are coupled to the RXDP and RXDM nodes 348 and 346, respectively. The output drive logic 425 produces the interface-specific data signals RXDP and RXDM corresponding to the bus-specific data signals DP and DM, respectively, in response to the receiver enable signal EN# and the output signals of the level shifters 423 and 423'.

With reference again to Table 1, when the signal EN# remains inactive ("1" or High), the differential signal RXD and the data signal RXDP stay in a logical "0" state while the data signal RXDM stays in a logical "1" state. At this time, the receiver 310 is disabled. When the data signals DP and DM remain in the "0" state and the signal EN# remains activated ("0" or Low), the outputs of the receiver 310 enter in a so-called "Single Ended Zero state", where the interface-specific data signals RXDP and RXDM stay in the "0" state with the differential signal RXD of Don't care (0 or 1) state. If the data signals DP and DM remain in the "0" and "1" states, respectively, with the EN# signal active, then the RXDP and RXDM signals stay in the "0" and "1" states, respectively, which is normally called a "Differential Zero state" or "J-state". Conversely, when the data signals DP and DM remain in the "1" and "0" states, respectively, with the EN# signal active, then the RXDP and RXDM signals stay in the "1" and "0" states, respectively, which is normally called a "Differential One state" or "K-state".

Figure 6:
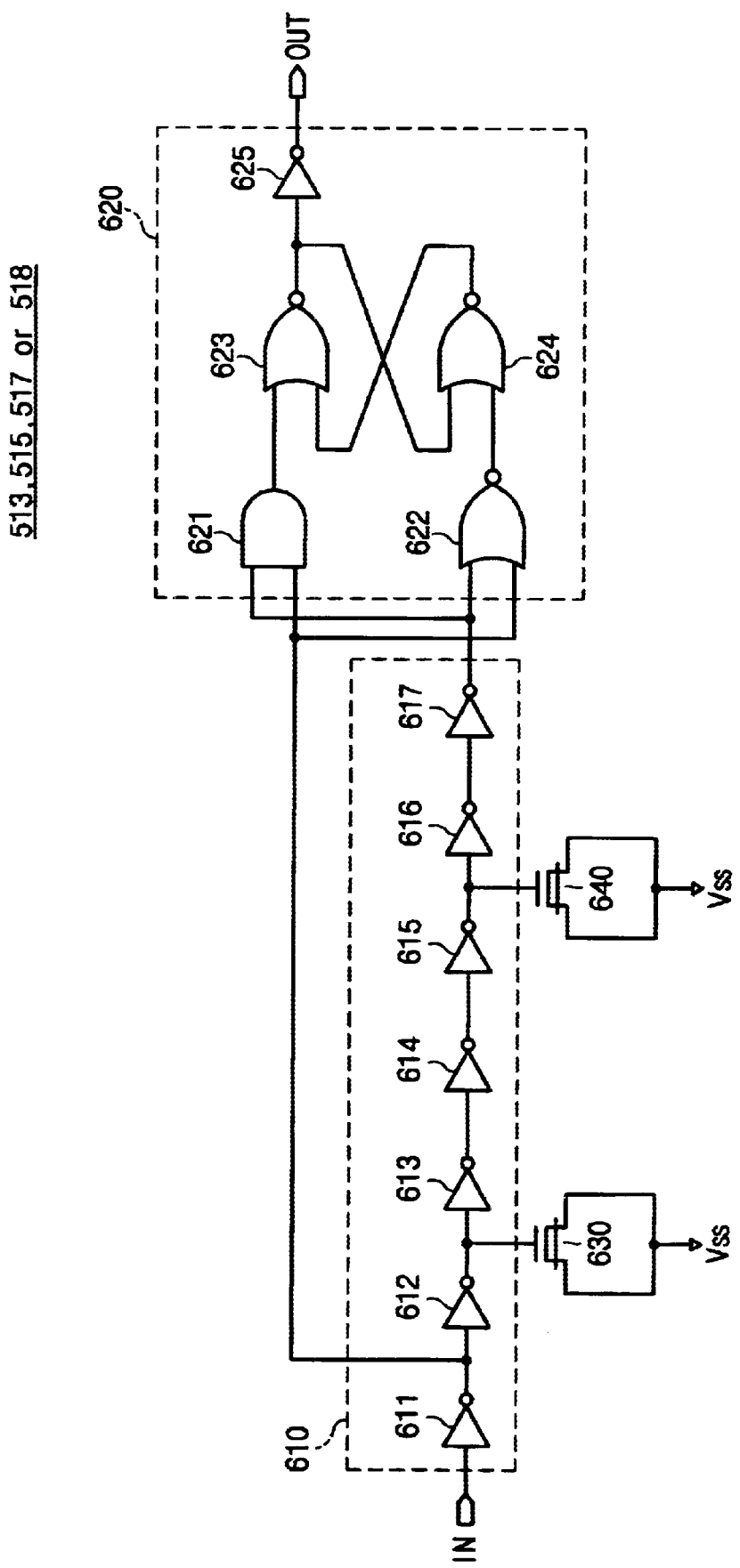
FIG. 6 is a detailed circuit diagram of each active filter shown in FIGS. 5A and 5B.

FIG. 6 illustrates a detailed circuit configuration of each active filter 513, 515, 517, or 518 shown in FIGS. 5A and 5B. As can be seen from FIG. 6, each active filter is configured to eliminate noises and glitches contained in the input signal IN effectively. Specifically, with reference to FIG. 6, each active filter 513, 515, 517 or 518 includes a delay circuit 610, a combinational logic 620, and D-NMOS capacitors 630 and 640. The delay circuit is comprised of an odd number of, for example, 7 serially-connected CMOS inverters 611–617. The combinational logic 620 includes an AND gate 621, NOR gates 622–624, and a CMOS inverter 625. An input of the NAND gate 621 is coupled between the inverters 611 and 612 within the delay circuit 610 and it's the other input to the output of the inverter 617. In the same manner, two inputs of the NOR gate are coupled between the inverters 611 and 612, and to the output of the inverter 617, respectively. The NOR gates 623 and 624 constitutes a signal latch circuit: the NOR gate 623 has an input coupled to an output of the AND gate 621 and the other input coupled to the output of the NOR gate 624, and the NOR gate 624 has its two input coupled to the output of the NOR gates 622 and 623, respectively. The CMOS inverter 625 is coupled to the output of the NOR gate 623.

Figure 7:
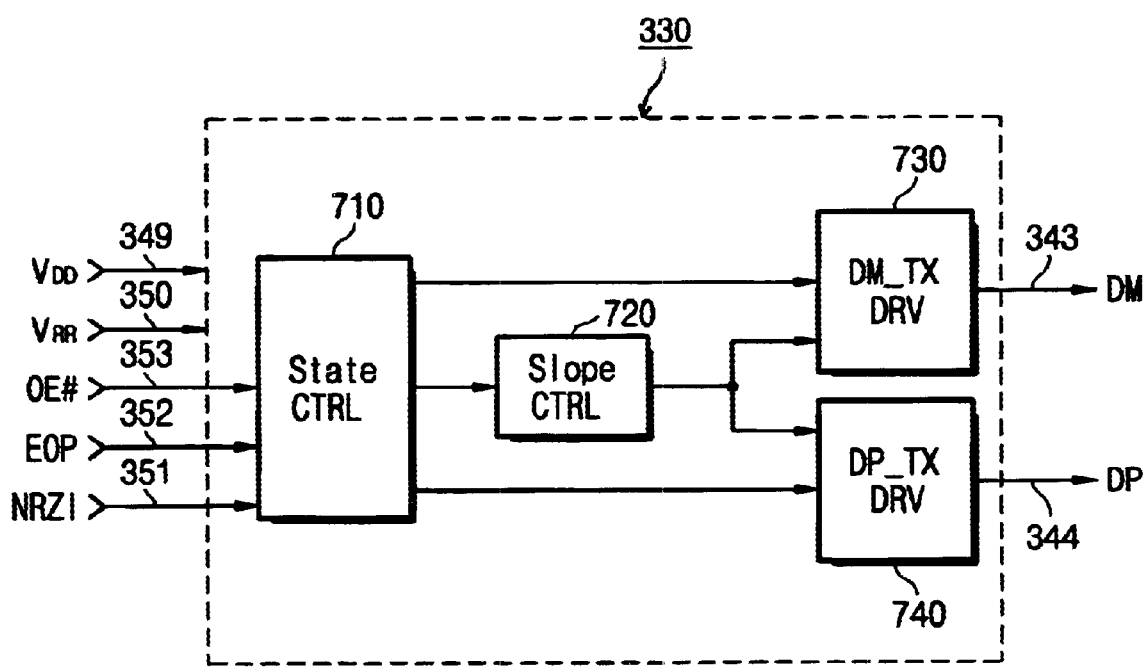
FIG. 7 is a block diagram showing a circuit configuration of the bus transmitter of FIG. 3.

FIG. 7 shows a circuit configuration of the bus transmitter circuit 330, which transmits the bus-specific data signals DM and DP onto the data lines 343 and 344 of the USB cable 200, in block diagram form. With reference to FIG. 7, the bus transmitter 330 comprises a state controller 710, a slope controller 720, and DM and DP output drivers 730 and 740. Among all the components of the transmitter 330, the state controller 710 is supplied with the supply voltage $V_{DD}$ from device power source (not shown), but the others are commonly suppled with both the regulated voltage $V_{RR}$ from the voltage regulator 110 and the power supply voltage $V_{DD}$.

The state controller 710 is responsive to such input signals as the transmitter enable signal OE# from the control unit 320, an encoded data signal NRZI and a data end signal EOP from the serial interface engine 130, and generates state control signals FNI, FNI#, PEN_DM, NENL_DM, PEN_DP and NENL_DP (refer to FIG. 8A) to determine when the DM and DP signals are driven to their predetermined data states. The slope controller 720 is responsive to the state control signals and generates slope control signals PBIAS, HVDD and NBIAS (refer to FIG. 8B) to control edge rates of the data signals. The DM output driver 730 is responsive to the state and slope control signals and generates the DM signal which will be transmitted onto the data line 343 of the USB cable 200. The DP output driver 740 is responsive to the state and slope control signals and generates the DP signal which will be transmitted onto the data line 344 of the USB cable 200. A functional truth table for the transmitter 330 is shown in the following table.

TABLE 2

| Inputs | | | Outputs | | |
|---|---|---|---|---|---|
| OE # | NRZI | EOP | DM | DP | State |
| 1 | X | X | Z | Z | High Impedance |
| 0 | X | 1 | 0 | 0 | Single Ended Zero |
| 0 | 0 | 0 | 1 | 0 | Differential Zero (J-state) |
| 0 | 1 | 0 | 0 | 1 | Differential One (K-state) |

In Table 2, "X" represents "Don't Care" state and "Z" represents "High Impedance" state.

In the transmitter 330, the DM and DP signals are driven to a high impedance state when the OE# signal is inactivated. The DM and DP signals are driven to the Single Ended Zero state when the OE# and EOP signals are activated. The DM and DP signals are driven to the Differential zero state (J-state) when the NRZI signal is in the "0" state, the EOP is inactive and the OE# remain active. The DM and DP signals are driven to the Differential one state (K-state) when the NRZI signal is in the "1" state, the EOP signal is inactivated and the OE# signal is activated.

FIGS. 8A through 8D are detailed circuit diagrams illustrating the circuit configurations of the state controller 710, the slope controller 720, the DM output driver 730 and the DP output driver 740, respectively, which are embodied with the Table 2.

Referring first to FIG. 8A, the state controller 710 is provided with such interface-specific input signals as the encoded data signal NRZI and the data end signal EOP from the serial interface engine 130 and the output enable (or transmitter enable) signal OE# from the control logic 320. The state controller 710 is responsive to the externally applied input signals OE#, EOP and NRZI, and generates a plurality of state control signals FNI, FNI#, PEN_DM, NENL_DM, PEN_DP, and NENL_DP to determine when the data signals DM and DP are driven to their predetermined data states. The state controller 710 includes inverters 821, 824, 825, 826, 829, 831, 833, 834, 837, 839 and 841, AND gates 827, 832, 835 and 840, active filters 823, 828 and 836, and NOR gates 830 and 838. The active filters 823, 828 and 836 are connected between the inverters 821 and 824, between the AND gate 827 and the inverter 829, and between the AND gate 835 and the inverter 837, respectively. These active filters 823, 828 and 836 each has the same or similar configuration as that of the active filter of FIG. 6.

The inverter 821 inverts the output enable signal OE# logically and generates a first state control signal FNI which is provided via the active filter 823 to the slope controller 720. The inverter 824 generates an inverted signal of the first state control signal FNI as a second state control signal FNI# which is also applied to the slope controller 720. The inverter 825 generates an inverted signal of the data end signal EOP. The inverter 826 generates an inverted signal of the encoded data signal NRZI. The AND gate 827 performs the logical AND operation of the outputs of the inverters 825 and 826. The inverter 829 generates an inverted signal of the output of the AND gate 827. A first gate logic, consisting of the NOR gate 830 and the inverter 831, receives the second state control signal FNI# and the output of the inverter 829, and generates a third state control signal PEN_DM. A second gate logic, consisting of the NAND gate 832 and the inverter 833, receives the first state control signal FNI and the output of the inverter 829, and generates a fourth state control signal NENL_DM. The inverter 834 logically inverts the output of the inverter 826. The AND gate 835 logically ANDs the outputs of the inverters 825 and 834. The inverter 837 inverts the output of the AND gate 835 logically. A third gate logic consisting of the NOR gate 838 and the inverter 839 receives the second state control signal FNI# and the output of the inverter 837, and generates a fifth state control signal PEN_DP. A fourth gate logic consisting of the NAND gate 840 and the inverter 841 receives the first state control signal FNI and the output of the inverter 837, and generates a sixth state control signal NENL_DP. The third to sixth state control signals PEN_DM, NENL_DM, PEN_DP and NENL_DP are commonly supplied to the DM and DP output drivers 730 and 740.

Figure 8B:
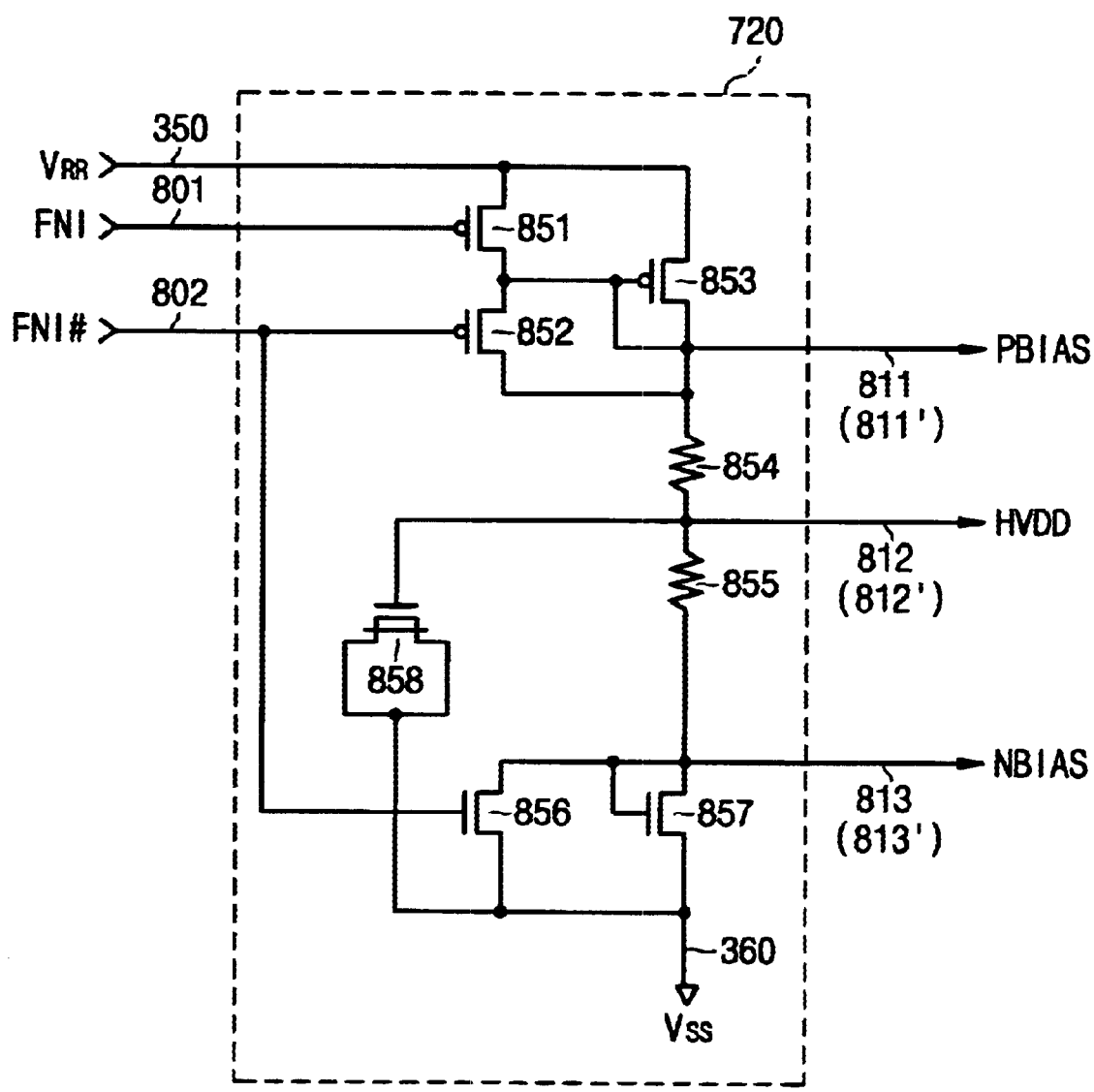

Referring next to FIG. 8B, the slope controller 720 is responsive to the first and second state control signals FNI and FNI# and generates three slope control signals PBIAS, HVDD and NBIAS to control edge rates of the bus-specific data signals DM and DP. As can be seen from the figure, the slope controller 720 includes a first power source node 350 applied with the regulated power supply voltages $V_{RR}$ from the voltage regulator 110 and a second power source node (i.e., ground node) 360 applied with the ground voltage $V_{SS}$. The controller 720 also includes a first and second input nodes 801 and 802 for receiving the first and second state control signals FNI, FNI#, respectively, and a first to third output nodes 811 (or 811'), 812 (or 812') and 813 (or 813') for providing a first to third slope control signals PBIAS, HVDD and NBIAS, respectively. The slope controller 720 further includes PMOS transistors 851, 852 and 853, resistors 854 and 855, NMOS transistors 856 and 857, and a D-NMOS capacitor 858.

The NMOS transistor 851 has its current path of which a first end is connected to the first power source node 350, and its control electrode connected to the first input node 801. The NMOS transistor 852 has its current path connected between a second end of the current path of the transistor 851 and the first output node 811 (or 811'), and its control electrode connected to the second input node 802. The NMOS transistor 853 has its current path connected between the first power source node 350 and the first output node 811 (or 811'), and a control electrode connected to both the first output node 811 (or 811') and a junction of the current paths of the transistors 851 and 852. The resistor 854 is connected between the first output node 811 (or 811') and the second output node 812 (or 812'). The resistor 855 is connected between the second output node 812 (or 812') and the third output node 813 (or 813'). The capacitor 858 is connected between the second output node 812 (or 812') and the ground node 360. The PMOS transistor 856 has its current path connected between the third output node 813 (or 813') and the ground node 360, and its control electrode connected to the second input node 802. The PMOS transistor 857 has its current path connected between the third output node 813

(or 813') and the ground node 360, and its control electrode connected to the third output node 813 (or 813').

The input signals FNI and FNI# make the slope controller 720 enabled/disabled by turning on/off the transistors 851 and 856. The capacitor 858 is provided for eliminating the ripple components on the output signal HVDD. This signal HVDD is maintained about at $V_{RR}/2$. The output signal PBIAS is used to control the slopes of the rising edges of the bus-specific data signals DM and DP, and the NBIAS signal is used to control the slopes of the falling edges of the data signals DM and DP. These signals PBIAS and NBIAS are maintained at respective constant levels enough to turn-on the transistors within the DM and DP drivers 730 and 740 (see transistors 861, 864, 867 and 868 in FIG. 8C, and 861', 864' 867' and 868' in FIG. 8D), which will be described in detail later. In addition, the transistor 852 is provided to minimize power consumption in stand-by state of the slope controller 720.

Figure 8C:
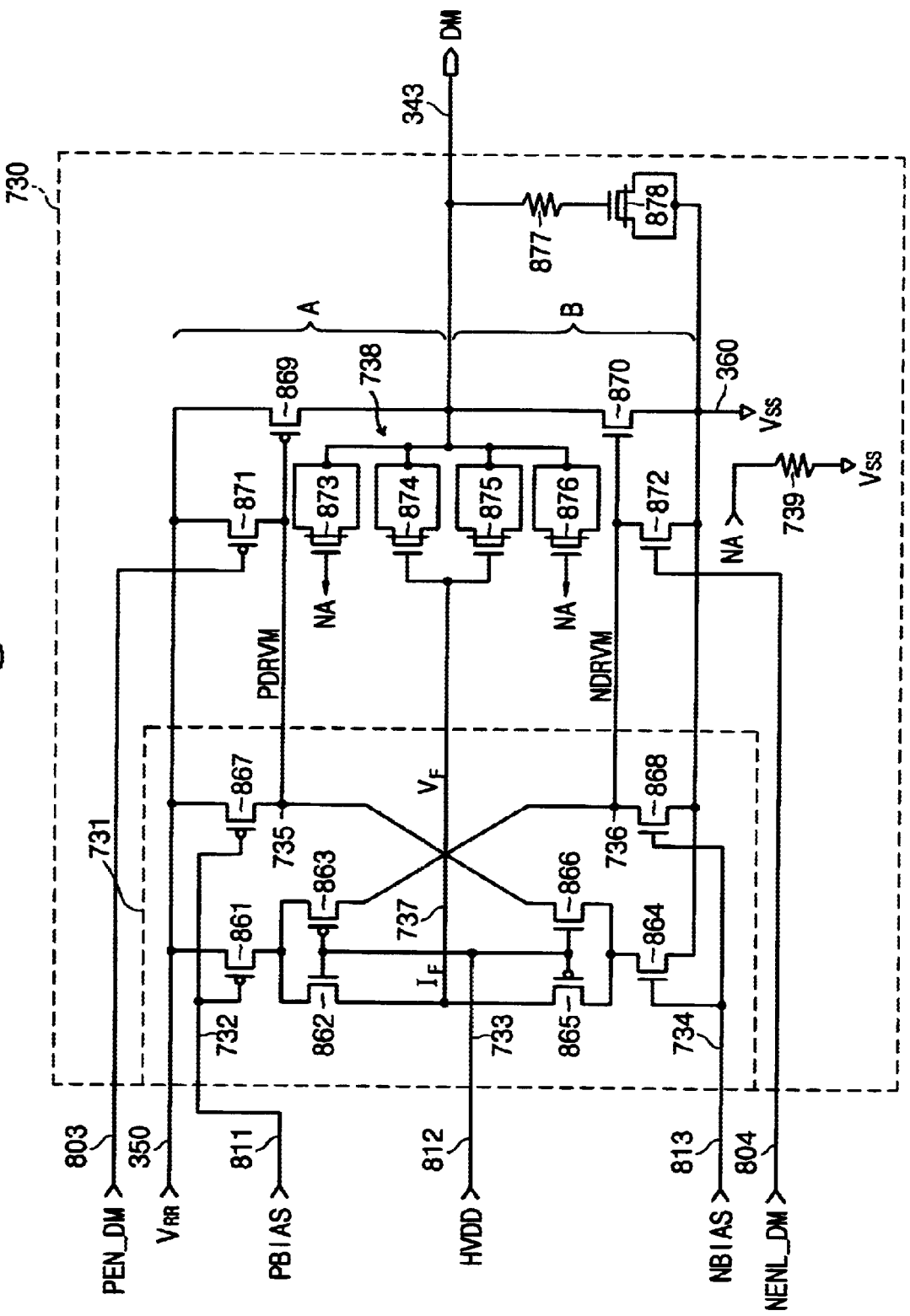

Referring to FIG. 8C, the DM output driver 730 is responsive to the state control signals PEN_DM and NENL_DM and the slope control signals PBIAS, HVDD and NBIAS, and generates the bus-specific DM data signal which is transmitted to the DM line of the USB cable 200. This driver 730 is supplied with the output voltage $V_{RR}$ of the voltage regulator 110.

The DM output driver 730 includes an operational amplifier 731 with a novel architecture. This operational amplifier 731 has a first input node 732 for receiving the slope control signal PBIAS, a second input node 733 for receiving the slope control signal HVDD, a third input node 734 for receiving the slope control signal NBIAS, a first output node 735 for providing a first output driving signal PDRVM, a second output node 736 for providing a second output driving signal NDRVM, and a feed back terminal 737.

The amplifier 731 further includes PMOS transistors 861, 863, 865 and 867, and NMOS transistors 862, 864, 866 and 868. The PMOS transistor 861 has its current path of which a first end is connected to the power source node 350, and its control electrode connected to the first input node 732 to which the first slope control signal PBIAS is applied. The NMOS transistor 862 has its current path of which a first end is connected to a second end of the current path of the transistor 861, and its control electrode connected to the second input node 733 to which the slope control signal HVDD is applied. The PMOS transistor 863 has a current path connected between a second end of the current path of the transistor 861 and the second output node 736, and its control electrode connected to the second input node 733. The NMOS transistor 864 has its current path of which a first end is connected to the ground node 360, and its control electrode connected to the third input node 734 to which the slope control signal NBIAS is applied. The PMOS transistor 865 has its current path connected between the second ends of the current paths of the transistors 862 and 864, and its control electrode connected to the second input node 733. The NMOS transistor 866 has its current path connected between a second end of the current path of the transistor 864 and the first output node 735, and its control electrode connected to the second input node 733. The PMOS transistor 867 has its current path connected between the power source node 350 and the first output node 735, and its control electrode connected to the first input node 732. The NMOS transistor 868 has its current path connected between the ground node 360 and the second output node 736, and its control electrode connected to the third input node 734.

In this amplifier 731, the current gain (or W/L ratio) of the transistor 861 is several (preferably, 2–4) times as large as that of the transistor 867. Like this, the transistor 864 has its current gain greater than that of the transistor 866.

The DM output driver 730 further comprises a PMOS current source transistor 871, a PMOS output pull-up transistor 869, an NMOS current sink transistor 872, and an NMOS output pull-down transistor 870. The current source transistor 871 has its current path connected between the power source node 350 and the output node 735 of the amplifier 731, and its control electrode connected to the state control signal PEN_DM. The output pull-up transistor 869 has its current path connected between the power source node 350 and the first data line 343 of the USB cable 200, and its control electrode connected to the output node 735 of the amplifier 731. The current sink transistor 872 has its current path connected between the ground node 360 and the output node 736 of the amplifier 731, and its control electrode connected to the state control signal NENL_DM. The output pull-down transistor 870 has its current path connected between the ground node 360 and the USB cable data line 343, and its control electrode connected to the output node 736 of the amplifier 731.

The DM output driver 730 further includes one or more D-NMOS feedback capacitors 738. The feedback capacitors 738 (for example, 873–876) are connected between the feed back terminal 737 of the amplifier 731 and either the USB cable data line 343 or a resistor 739 coupled to the ground node 360. More specifically, the capacitors 873 and 876 are connected between the USB cable data line 343 and the resistor 739. The capacitors 874 and 875 are connected between the amplifier feed back terminal 737 and the USB cable data line 343.

The DM output driver 730 further includes a circuit, consisting of a resistor 877 and a D-NMOS capacitor 878, which compensates for variations of load capacitance on the USB cable data line 343. The resistor 877 and the capacitor 878 are connected in series between the output pad (or USB cable data line 343) and the ground node 360. The resistor 877 is provided to prevent the gate oxide breakdown of the capacitor 878 due to ESD. Since the capacitor 878 increases the internal capacitance of the driver 730, the bus signal transmitter 330 is able to have a stable output characteristics even though its load varies significantly.

Figure 8D:
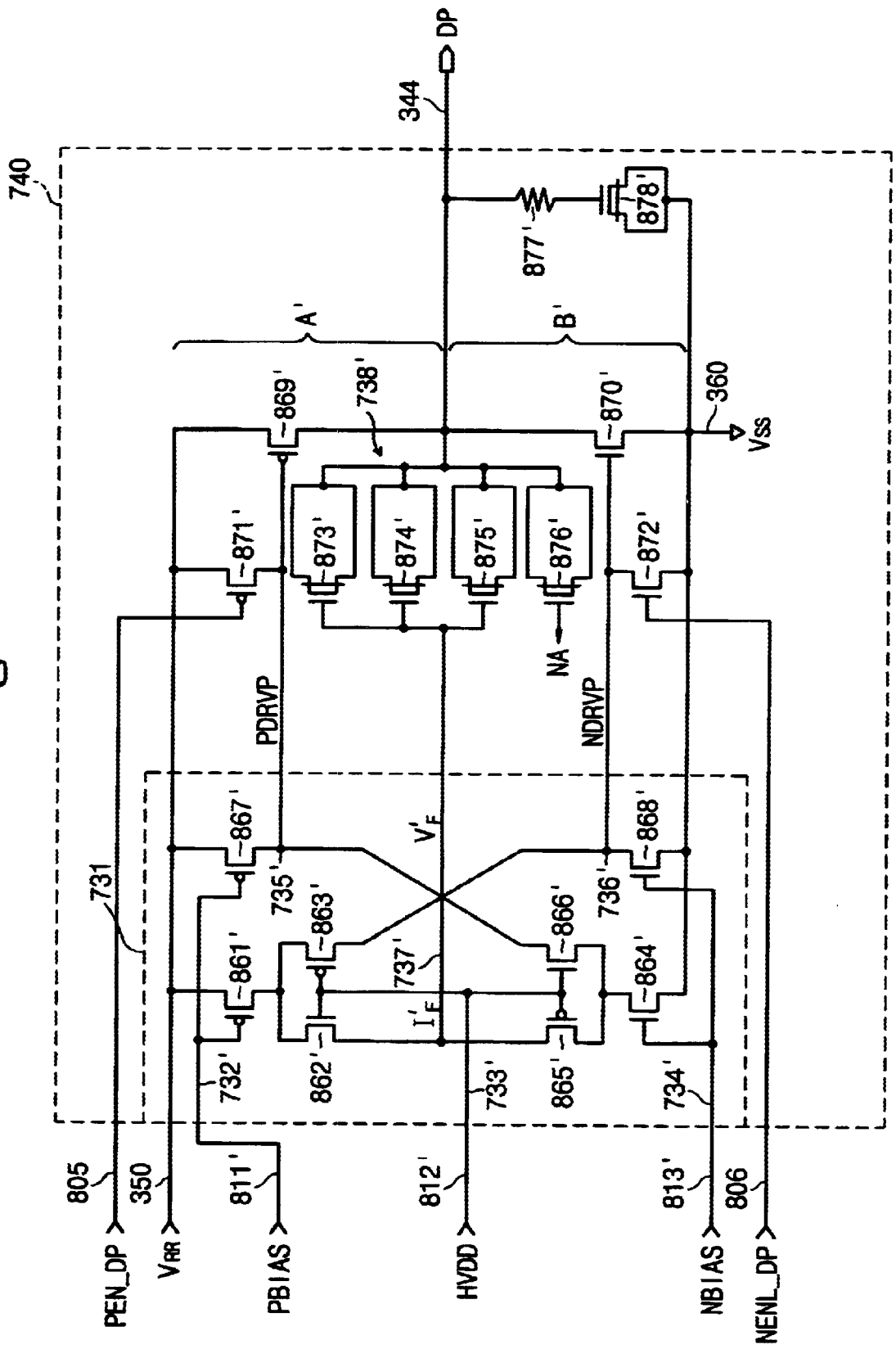
Figure 9A:
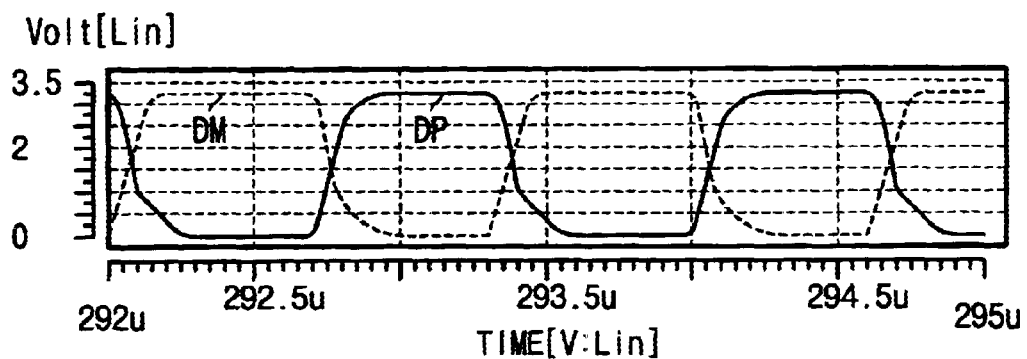
FIGS. 9A through 9H are waveform diagrams at various points in the circuits of FIGS. 8A through 8D.
Figure 9B:
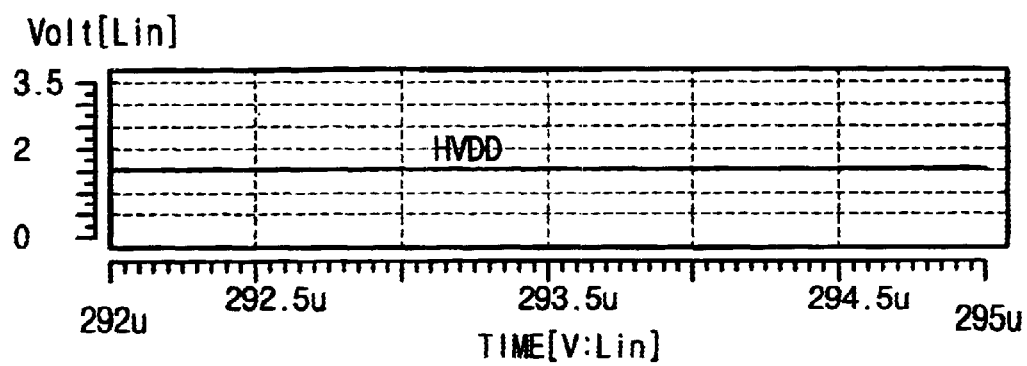
Figure 9C:
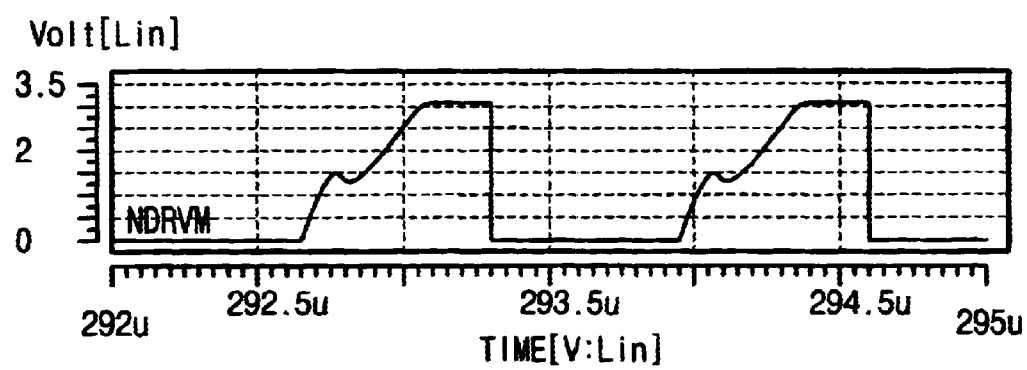
Figure 9D:
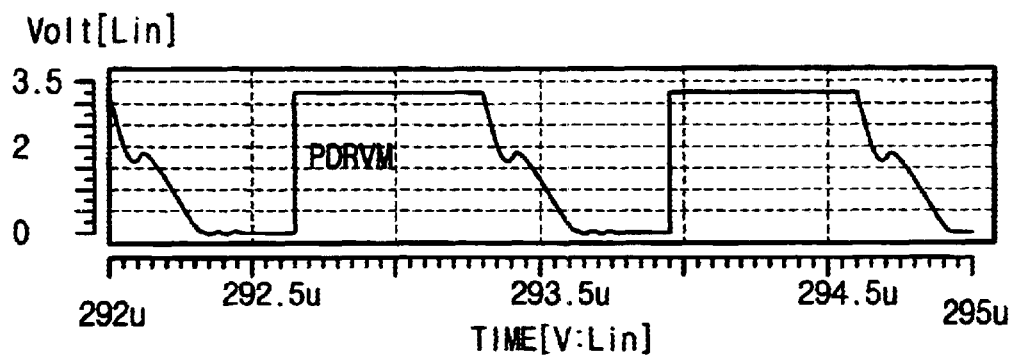
Figure 9E:
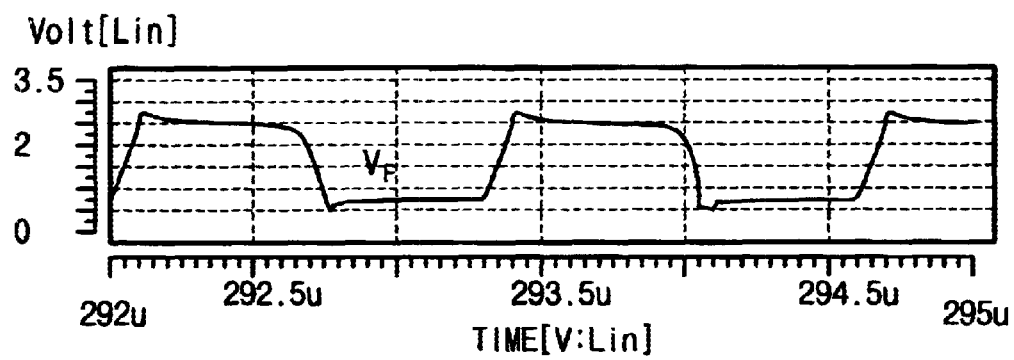
Figure 9F:
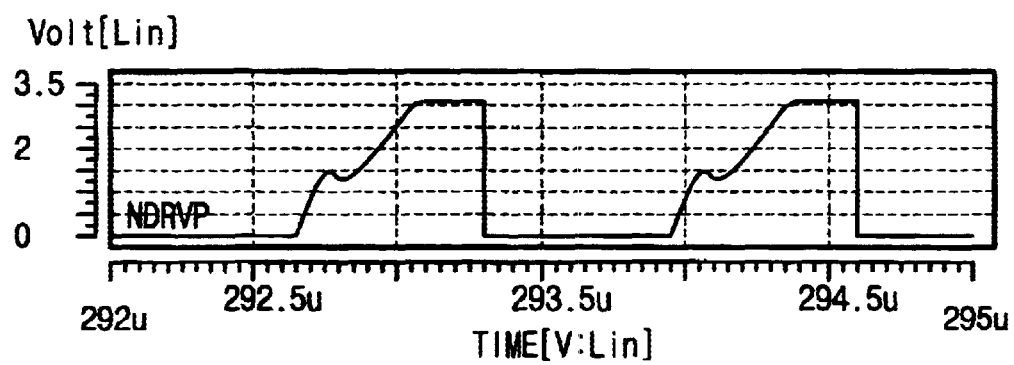
Figure 9G:
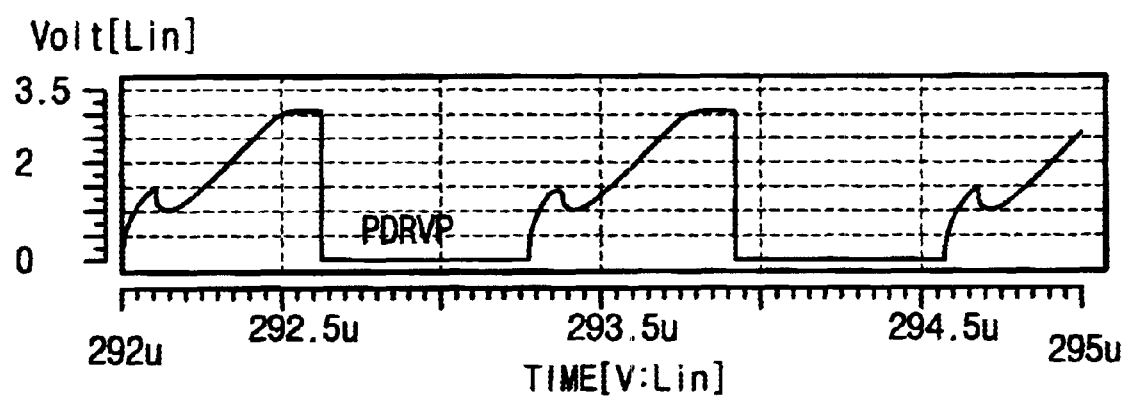
Figure 9H:
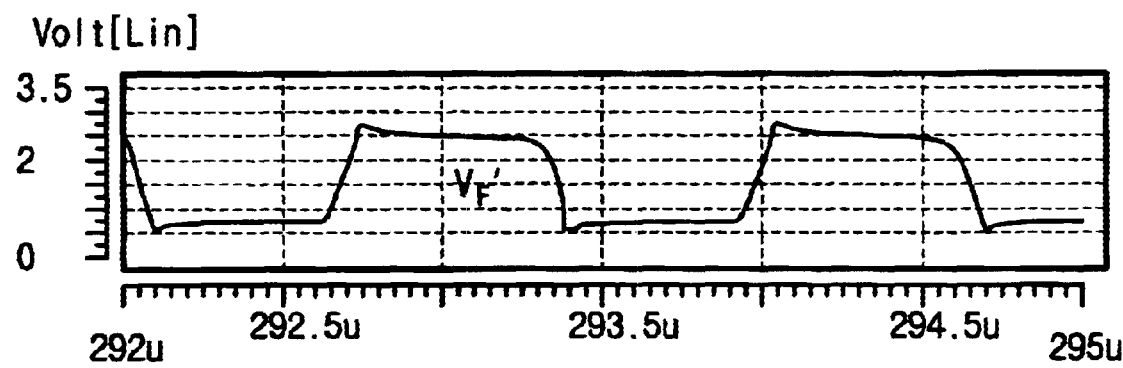

Referring to FIG. 8D, the DP output driver 740 has a circuit configuration similar to that of the DM output driver 730. As can be seen from the figure, the DP output driver 740 is responsive to the state control signals PEN_DP and NENL_DP from the state controller 710 and the slope control signals PBIAS, HVDD and NBAIS from the slope controller 720, and generates the bus-specif DP data signal which is transmitted onto the USB cable data line 344. This driver 740 is also supplied with the output voltage $V_{RR}$ of the voltage regulator 110.

The DP output driver 740 includes an operational amplifier 741 with a novel architecture, like the DM output driver 730. This operational amplifier 741 has a first input node 732' for receiving the slope control signal PBIAS, a second input node 733' for receiving the slope control signal HVDD, a third input node 734' for receiving the slope control signal NBIAS, a first output node 735' for providing a first output driving signal PDRVP, a second output node 736' for providing a second output driving signal NDRVP, and a feed back terminal 737'.

The amplifier 741 further includes PMOS transistors 861', 863', 865' and 867', and NMOS transistors 862', 864', 866' and 868'. The PMOS transistor 861' has its current path of which a first end is connected to the power source node 350, and its control electrode connected to the first input node 732' to which the first slope control signal PBIAS is applied. The NMOS transistor 862' has its current path of which a first end is connected to a second end of the current path of the transistor 861', and its control electrode connected to the second input node 733' to which the slope control signal HVDD is applied. The PMOS transistor 863' has a current path connected between the second end of the current path of the transistor 861' and the second output node 736', and its control electrode connected to the second input node 733'. The NMOS transistor 864' has its current path of which a first end is connected to the ground node 360, and its control electrode connected to the third input node 734' to which the slope control signal NBIAS is applied. The PMOS transistor 865' has its current path connected between the second ends of the current paths of the transistors 862' and 864', and its control electrode connected to the second input node 733'. The NMOS transistor 866' has its current path connected between a second end of the current path of the transistor 864' and the first output node 735', and its control electrode connected to the second input node 733'. The PMOS transistor 867' has its current path connected between the power source node 350 and the first output node 735', and its control electrode connected to the first input node 732'. The NMOS transistor 868' has its current path connected between the ground node 360 and the second output node 736', and its control electrode connected to the third input node 734'.

In this amplifier 741, the current gain of the transistor 861' is several (preferably, 2–4) times as large as that of the transistor 867'. The transistor 864' is also greater than the transistor 866' in current gain or size.

The DP output driver 740 further comprises a PMOS current source transistor 871', a PMOS output pull-up transistor 869', an NMOS current sink transistor 872', and an NMOS output pull-down transistor 870'. The current source transistor 871' has its current path connected between the power source node 350 and the output node 735' of the amplifier 741, and its control electrode connected to the state control signal PEN_DP. The output pull-up transistor 869' has its current path connected between the power source node 350 and the first data line 344 of the USB cable 200, and its control electrode connected to the output node 735' of the amplifier 741. The current sink transistor 872' has its current path connected between the ground node 360 and the output node 736' of the amplifier 741, and its control electrode connected to the state control signal NENL_DP. The output pull-down transistor 870' has its current path connected between the ground node 360 and the USB cable data line 344, and its control electrode connected to the output node 736' of the amplifier 741.

The DM output driver 740 further includes one or more D-NMOS feedback capacitors 738'. The feedback capacitors 738' (for example, 873'–876') are connected between the feed back terminal 737' of the amplifier 741 and either the USB cable data line 344 or the resistor 739 shown in FIG. 8C. More specifically, the capacitors 873' through 875' are connected in series between the amplifier feed back terminal 737' and the USB cable data line 344. The capacitor 876' is connected between the USB cable data line 344 and the resistor 739.

The DM output driver 740 further includes a circuit, consisting of a resistor 877' and a D-NMOS capacitor 878', which compensates for variations of load capacitance on the USB cable data line 344. The resistor 877' and the capacitor 878' are connected in series between the output pad (or USB cable data line 344) and the ground node 360. The resistor 877' prevents the gate oxide breakdown of the capacitor 878' due to ESD. Since the capacitor 878' increases the internal capacitance of the driver 740, the bus signal transmitter 330 is able to have a stable output characteristics in spite of the relatively large variations of load.

In FIGS. 8C and 8D, reference characters A and A' indicate the circuit parts to control the rising slopes of the DM and DP signals and B and B' indicate the circuit parts to control the falling slopes of the DM and DP signals. The signals on the rising slope control circuit parts A and A' have the phases opposite to the respective signals on the falling slope control circuit parts B and B'. However, they have the same operational principles. For the convenience of explanation and to avoid the duplication of explanation, thus, only the part A will be described in detail with reference to FIG. 3C.

In FIG. 8C, initially, the voltage $V_F$ on the node 737 is assumed to be set at $V_{RR}/2$. In this case, a virtual ground is established on the node 737. When the transmitter 330 carries on the DM and DP onto the USB cable 200, the DEN_DM and BENL_DM signals, as well as PEN_DP and NENL_DP signals, remain at high and low levels, respectively. At this time, the signals PBIAS, HVDD and NBIAS from the slope controller 720 are maintained at their respective predetermined levels. Thus, the transistors 871 and 872 turns off and the transistors 861, 864, 867 and 868 on.

The edge rate (or slope) of the output signal DM determines the amount of the feedback current $I_F$ flowing through the feedback capacitors 738, as the following equation (1):

$$I_F = C_{738} \cdot \frac{dV}{dt} \quad (1)$$

where $C_{738}$ is the capacitance of the feedback capacitor 738 and the dV/dt is the edge rate of the DM signal.

When the DM signal on the USB cable data line 343 has the slope equal to its target slope, the voltage $V_F$ on the feedback node 737 is maintained at $V_{RR}/2$. At this time, the current $I_{862}$ flowing through the transistor 862 equals the feedback current $I_F$ so the voltage $V_F$ does not change. In this case, since there are no voltage changes on the output nodes 735 and 736, the DM signal increases at a constant edge rate.

During a rising edge transition of the DM signal, if the edge rate dV/dt of the signal DM is considerably smaller than a target edge rate, then the voltage $V_F$ becomes higher than the $V_{RR}/2$ because the feedback current $I_F$ decreases, yielding a decrease in the conductivity of the NMOS transistor 862, so the current $I_{865}$ flowing through the PMOS transistor 865 decreases. As a result of this, the current $I_{866}$ flowing through the NMOS transistor 866 increases relatively. This results in a voltage drop on the node 735. This voltage drop yields an increase in the current $I_{869}$ flowing through the PMOS transistor 869 to the USB cable data line 343. Consequently, the voltage rate dV/dt of the DM signal becomes larger.

During a rising edge transition of the DM signal, if the edge rate dV/dt of the DM signal is considerably larger than a target edge rate, the voltage $V_F$ becomes lower than the $V_{RR}/2$ because the feedback current $I_F$ increases, yielding an increase in the conductivity of the NMOS transistor 862, so the current $I_{862}$ flowing through the NMOS transistor 862 increases. As a result of this, the current $I_{866}$ flowing through the NMOS transistor 866 decreases relatively. This results in a voltage rise on the node 735. This voltage rise yields a decrease in the current $I_{869}$ flowing through the PMOS transistor 869 to the USB cable data line 343. Consequently, the voltage rate dV/dt of the DM signal becomes smaller.

During a falling edge transition of the DM signal, if the edge rate dV/dt of the signal DM is considerably smaller than a target edge rate, then the voltage $V_F$ becomes higher than the $V_{RR}/2$ because the feedback current $I_F$ decreases, yielding a decrease in the conductivity of the NMOS transistor 862, so the current $I_{862}$ flowing through the NMOS transistor 862 decreases. As a result of this, the current $I_{863}$ flowing through the PMOS transistor 863 increases relatively. This results in a voltage rise on the node 736. This voltage rise yields an increase in the current $I_{870}$ flowing from the USB cable data line 343 through the NMOS transistor 870 to the ground node 360. Consequently, the voltage rate dV/dt of the DM signal becomes larger.

During a falling edge transition of the DM signal, if the edge rate dV/dt of the DM signal is considerably larger than a target edge rate, the voltage $V_F$ becomes lower than the $V_{RR}/2$ because the feedback current $I_F$ increases, yielding an increase in the conductivity of the NMOS transistor 862, so the current $I_{862}$ flowing through the NMOS transistor 862 increases. As a result of this, the current $I_{863}$ flowing through the NMOS transistor 863 decreases relatively. This results in a voltage drop on the node 736. This voltage drop yields a decrease in the current $I_{870}$ flowing from the USB cable data line 343 through the NMOS transistor 870 to the ground node 360. Consequently, the voltage rate dV/dt of the DM signal becomes smaller.

In FIGS. 9A through 9H, the waveforms of the signals on the above-described circuits of FIGS. 8A through 8D are illustrated.

As described above, since the signal transmitter of the present invention is implemented only with two novel operational amplifiers and their respective output drivers, it can provides a relatively increased integration for the bus interface chip. Increasing the internal capacitance, the transmitter is also able to have a stable output characteristics even though its load varies significantly.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An integrated transmitter circuit for transmitting at least first and second data signals onto at least first and second data lines, the transmitter circuit comprising:

a first means responsive to a plurality of externally applied input signals, for generating a plurality of state control signals to determine when the at least first and second data signals are driven to their predetermined data states, wherein the input signals are an encoded data signal, a data end signal to indicate an end of the encoded data signal, and an output enable signal to enable the transmitter circuit to output the at least first and second data signals;

a second means responsive to the state control signals, for generating a plurality of slope control signals to control edge rates of the at least first and second data signals;

a third means responsive to the state control signals from the first means and the slope control signals from the second means, for generating the first data signal to be transmitted onto the first data line; and a fourth means responsive to the state control signals form the first means and the slope control signals from the second means, for generating the second data signal to be transmitted onto the second data line.

2. The transmitter circuit according to claim 1, wherein the at least first and second data signals transmitted from the transmitter circuit are driven to a first data state when the data end signal and the output enable signal are activated; to a second data state when the encoded data signal is in a first logic state, the data end signal is inactivated and the output enable signal is activated; and to a third data state when the encoded data signal is in a second logic state, the data end signal is inactivated and the output enable signal is activated, respectively.

3. The transmitter circuit according to claim 1, wherein the at least first and second data signals transmitted from the transmitter circuit are driven to a high impedance state when the output enable signal is inactivated.

4. The transmitter circuit according to claim 1, wherein the first means comprises:

a first inverter for logically inverting the output enable signal to generate a first state control signal;

a second inverter for logically inverting the first state control signal to generate a second state control signal;

a third inverter for logically inverting the data end signal;

a fourth inverter for logically inverting the encoded data signal;

a first AND gate for logically ANDing outputs of the third and fourth inverters;

a fifth inverter for logically inverting an output of the first AND gate;

a first gate logic for receiving the second state control signal and an output of the fifth inverter to generate a third state control signal;

a second gate logic for receiving the first state control signal and the output of the fifth inverter to generate a fourth state control signal;

a sixth inverter for logically inverting the output of the fourth inverter;

a second AND gate for logically ANDing the outputs of the third and sixth inverters;

a seventh inverter for logically inverting an output of the second AND gate;

a third gate logic for receiving the second state control signal and an output of the seventh inverter to generate a fifth state control signal; and a fourth gate logic for receiving the first state control signal and the output of the seventh inverter to generate a sixth state control signal.

5. The transmitter circuit according to claim 4, wherein the first means further comprises filters connected between the first and the second inverters, between the first AND gate and the fifth inverter, and between the second AND gate and the seventh inverter, respectively.

6. The transmitter circuit according to claim 4, wherein the third means comprises:

at least first and second power source nodes externally applied with at least first and second supply voltages, respectively;

at least one operational amplifier having a first input node for receiving a first slope control signal from the second means, a second input node for receiving a second slope control signal from the second means, a third input node for receiving a third slope control signal from the second means, a first output node for providing a first output driving signal, a second output node for providing a second output driving signal, and a feed back terminal;

a current source transistor having a current path connected between the first power source node and the first output node of the operational amplifier, and a control electrode connected to the third state control signal;

an output pull-up transistor having a current path connected between the first power source node and the first data line, and a control electrode connected to the first output node of the operational amplifier;

a current sink transistor having a current path connected between the second power source node and the second output node of the operational amplifier, and a control electrode connected to the fourth state control signal;

an output pull-down transistor having a current path connected between the second power source node and the first data line, and a control electrode connected to said second output node of the operational amplifier; and at least one feedback capacitor connected between the feed back terminal of the operational amplifier and said first data line.

7. The transmitter circuit according to claim 6, further comprising at least one feedback capacitor connected between the second power source node and the first data line.

8. The transmitter circuit according to claim 6, wherein the operational amplifier comprises:

a first transistor of a first type having a current path of which a first end is connected to the first power source node, and a control electrode connected to the first input node to which the first slope control signal is applied;

a second transistor of a second type having a current path of which a first end is connected to a second end of the current path of the first transistor, and a control electrode connected to the second input node to which the second slope control signal is applied;

a third transistor of the second type having a current path of which a first end is connected to the second power source node, and a control electrode connected to the third input node to which the third slope control signal is applied;

a fourth transistor of the first type having a current path connected between second ends of the current paths of the second and third transistors, and a control electrode connected to the second input node;

a fifth transistor of the first type having a current path connected between the first power source node and the first output node, and a control electrode connected to the first input node;

a sixth transistor of the second type having a current path connected between a second end of the current path of the third transistor and the first output node, and a control electrode connected to the second input node;

a seventh transistor of the second type having a current path connected between the second power source node and the second output node, and a control electrode connected to the third input node; and an eighth transistor of the first type having a current path connected between a second end of the current path of the first transistor and the second output node, and a control electrode connected to the second input node.

9. The transmitter circuit according to claim 6, wherein the third means further comprises means for compensating for variations of load capacitance on the first data line.

10. The transmitter circuit according to claim 9, wherein the means for compensating for variations of the load capacitance comprises a resistor and a capacitor which are connected in series between the first data line and the second power source node.

11. The transmitter circuit according to claim 4, wherein the fourth means comprises:

at least first and second power source nodes externally applied with at least first and second supply voltages, respectively;

at least one operational amplifier having a first input node for receiving a first slope control signal from the second means, a second input node for receiving a second slope control signal from the second means, a third input node for receiving a third slope control signal from the second means, a first output node for providing a first output driving signal, a second output node for providing a second output driving signal, and a feed back terminal;

a current source transistor having a current path connected between the first power source node and the first output node of the operational amplifier, and a control electrode connected to the fifth state control signal;

an output pull-up transistor having a current path connected between the first power source node and the second data line, and a control electrode connected to the first output node of the operational amplifier;

a current sink transistor having a current path connected between the second power source node and the second output node of the operational amplifier, and a control electrode connected to the sixth state control signal;

an output pull-down transistor having a current path connected between the second power source node and the second data line, and a control electrode connected to the second output node of the operational amplifier; and at least one feedback capacitor connected between the feed back terminal of the operational amplifier and the second data line.

12. The transmitter circuit according to claim 11, further comprising at least one feedback capacitor connected between the second power source node and the second data line.

13. The transmitter circuit according to claim 11, wherein the operational amplifier comprises:

a first transistor of a first type having a current path of which a first end is connected to the first power source node, and a control electrode connected to the first input node to which the first slope control signal is applied;

a second transistor of a second type having a current path of which a first end is connected to a second end of the current path of the first transistor, and a control electrode connected to the second input node to which the second slope control signal is applied;

a third transistor of the second type having a current path of which a first end is connected to the second power source node, and a control electrode connected to the third input node to which the third slope control signal is applied;

a fourth transistor of the first type having a current path connected between second ends of the current paths of the second and third transistors, and a control electrode connected to the second input node;

a fifth transistor of the first type having a current path connected between the first power source node and the first output node, and a control electrode connected to the first input node;

a sixth transistor of the second type having a current path connected between a second end of the current path of the third transistor and the first output node, and a control electrode connected to the second input node;

a seventh transistor of the second type having a current path connected between the second power source node and the second output node, and a control electrode connected to the third input node; and an eighth transistor of the first type having a current path connected between a second end of the current path of the first transistor and the second output node, and a control electrode connected to the second input node.

14. The transmitter circuit according to claim 11, wherein the fourth means further comprises means for compensating for variations of load capacitance on the second data line.

15. The transmitter circuit according to claim 14, wherein the means for compensating for variations of the load capacitance comprises a resistor and a capacitor which are connected in series between the second data line and the second power source node.

16. The transmitter circuit according to claim 1, wherein the second means comprises:

at least first and second power source nodes externally applied with at least first and second supply voltages, respectively;

at least first and second input nodes for receiving at least first and second state control signals from the first means, respectively;

a plurality of output nodes for outputting the plurality of slope control signals;

a first transistor of a first type having a current path of which a first end is connected to the first power source node, and a control electrode connected to the first input node;

a second transistor of the first type having a current path connected between a second end of the current path of the first transistor and a first output node, and a control electrode connected to the second input node;

a third transistor of the first type having a current path connected between the first power source node and the first output node, and a control electrode connected to both the first output node and a junction of the current paths of the first and second transistors;

a fourth transistor of a second type having a current path connected between a third output node and the second power source node, and a control electrode connected to the second input node; and a fifth transistor of the second type having a current path connected between the third output node and the second power source node, and a control electrode connected to the third output node.

17. The transmitter circuit according to claim 16, wherein the first state control signal provided from the first means to the first input node has an inverse logic of the output enable signal, and the second state control signal from the first means to the second node has an inverse logic of the first state control signal.

18. The transmitter circuit according to claim 16, further comprising a first resistor connected between the first output node and a second output node, a second resistor connected between the second output node and the third output node, and a capacitor connected, between the second output node and the second power source node.

19. The transmitter circuit according to claim 1, wherein the transmitted and encoded data signals are Non Return to Zero Inverted signals.

20. The transmitter circuit claim 1, wherein the at least first and second data lines are data lines of a Universal Serial Bus (USB) cable.

21. A receiver circuit for receiving at least first and second input data signals from at least first and second data lines in response to an enable signal, the receiver circuit comprising:

a differential amplifier for amplifying a voltage difference between the first and second input data signals to generate a differential signal;

a first level shifter for shifting a swing of the differential signal to generate as a first output data signal a differential signal with a shifted swing;

a first schmitt trigger for generating an output signal having a hysteresis in response to a swing of the first input data signal;

a second level shifter for shifting a swing of the output signal of the first schmitt trigger to generate a first level-shifted output data signal;

a second schmitt trigger for generating an output signal having a hysteresis in response to a swing of the second input data signal;

a third level shifter for shifting a swing of the output signal of the second schmitt trigger to generate a second level-shifted output data signal; and an output drive logic for generating second and third output data signals in response to the enable signal and the first and second level-shifted output data signals.

22. The receiver circuit according to claim 21, wherein the differential signal generated from the differential amplifier swings substantially in the same range as the input data signals do.

23. The receiver circuit according to claim 21, wherein the second and third output data signals are driven to a first data state when the input data signals both are in a first logic state and the enable signal is activated; to a second data state when the first input data signal is in a second logic state, the second input data signal in the first logic state and the enable signal is activated; and to a third data state when the first input data signal is in the first logic state, the second input data signal is in the second logic state and the enable signal is activated, respectively.

24. The receiver circuit according to claim 21, wherein the differential amplifier and the schmitt triggers are enabled in response to the enable signal.

25. The receiver circuit according to claim 21, wherein the input data signals are encoded data signals.

26. The receiver circuit according to claim 25, wherein the encoded data signals are Non Return to Zero Inverted signals.

27. The receiver circuit according to claim 21, wherein the first and second input data signals each swings in a range from −0.5 to 3.8 volts.

28. The receiver circuit according to claim 21, wherein the at least first and second data lines are data lines of Universal Serial Bus (USB) cable.

29. A transceiver circuit for transmitting/receiving data signals to/from a data bus and an interfacing means, the transceiver circuit comprising:

a transmitter for generating to the data bus at least first and second encoded output data signals each being in a first swing range in response to at least a first encoded input data signal from the interfacing means, a data end signal to indicate an end of the first encoded input data signal and a select signal from the interfacing means, each of which is in a second swing range so as to provide the first and second encoded bus data signals to data bus;

an inverter for logically inverting the select signal; and a receiver for receiving at least second and third encoded input data signals from the data bus each being in the second swing range and generating at least third to fifth encoded output data signals to the interfacing means each being in the first swing range in response to an inverted select signal from the inverter, wherein one of the at least third to fifth encoded output data signals is a differential signal of the other ones.

30. The transceiver circuit according to claim 29, wherein the first and second encoded output data signals are driven to a first data state when the data end and select signals are activated; to a second data state when the first encoded input data signal is in a first logic state, the data end signal is inactivated and the select signal is activated; and to a third data state when the first encoded input data signal is in a second logic state, the data end signal is inactivated and the select signal is activated, respectively.

31. The transceiver circuit according to claim 29, wherein the first and second encoded output data signals are driven to a high impedance state when the select signal is inactivated.

32. The transceiver circuit according to claim 29, wherein the at least third to fifth encoded output data signals are driven to a first data state when the second and third encoded input data signals both are in a first logic state and the inverted select signal is inactivated; to a second data state when the second and third encoded input data signals is in a second logic state, and the inverted select signal is activated; and to a third data state when the second encoded input data signal is in the first logic state, the third encoded input data signal is in the second logic state and the inverted select signal is activated, respectively.

33. The transceiver circuit according to claim 29, wherein the receiver is disabled in response to the inverted select signal.

34. The transceiver circuit according to claim 29, further comprises a voltage regulator for supplying a power supply voltage within the first swing range to both the transmitter and the receiver.

35. The transceiver circuit according to claim 34, wherein the transmitter, the receiver, and the voltage regulator are implemented into a single semiconductor chip.

* * * * *